United States Patent
Miura et al.

(10) Patent No.: US 11,837,029 B2
(45) Date of Patent: Dec. 5, 2023

(54) BIOMETRIC AUTHENTICATION DEVICE AND BIOMETRIC AUTHENTICATION METHOD

(71) Applicant: Hitachi, Ltd., Tokyo (JP)

(72) Inventors: Naoto Miura, Tokyo (JP); Yusuke Matsuda, Tokyo (JP); Akio Nagasaka, Tokyo (JP); Yo Nonomura, Tokyo (JP); Keiichiro Nakazaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 181 days.

(21) Appl. No.: 17/497,802

(22) Filed: Oct. 8, 2021

(65) Prior Publication Data
US 2022/0121869 A1    Apr. 21, 2022

(30) Foreign Application Priority Data
Oct. 21, 2020    (JP) .................................. 2020-176985

(51) Int. Cl.
*G06K 9/28*    (2006.01)
*G06V 40/60*    (2022.01)
(Continued)

(52) U.S. Cl.
CPC .............. *G06V 40/67* (2022.01); *G06F 18/22* (2023.01); *G06T 7/194* (2017.01); *G06V 10/143* (2022.01);
(Continued)

(58) Field of Classification Search
CPC ....... G06T 7/194; G06V 40/14–40/145; G06V 10/143; G06V 40/1312; G06V 40/12–40/1394; G06V 40/67
See application file for complete search history.

(56) References Cited

U.S. PATENT DOCUMENTS 8,509,495 B2 *   8/2013   Xu ...................... G06V 10/145
                                                        382/128
8,787,622 B2 *   7/2014   Watanabe ............. G06V 40/23
                                                        382/115
(Continued)

FOREIGN PATENT DOCUMENTS

CN    108108708 A    6/2018
CN    109977727 A    7/2019
(Continued)

OTHER PUBLICATIONS

Extended European Search Report dated Jun. 30, 2022, from counterpart EP Patent Application No. 21200460.0, 17 pages.
(Continued)

*Primary Examiner* — Brian Werner
(74) *Attorney, Agent, or Firm* — Procopio, Cory, Hargreaves & Savitch LLP

(57) ABSTRACT

The objective is to achieve highly accurate authentication even when there is variation in the ambient light environment during biometric imaging. A biometric authentication device includes an image capturing unit that captures images of a living body, a light source for capturing images of the living body, an optical filter that selectively passes and blocks light according to wavelength, a spectroscopic processing unit that separates multiple wavelengths captured simultaneously, respectively, and a calculation unit that calculates the shape and posture of a predetermined part of the living body in the captured images, a background removal unit that removes the background from the image of the living body using the spectral images of the living body and the spectral image of the unwanted ambient light, and an authentication unit that performs biometric authentication using the image of the predetermined part.

15 Claims, 15 Drawing Sheets

(51) Int. Cl.
*G06T 7/194* (2017.01)
*G06V 10/60* (2022.01)
*G06V 10/143* (2022.01)
*G06V 10/145* (2022.01)
*G06F 18/22* (2023.01)
*G02B 5/20* (2006.01)

(52) U.S. Cl.
CPC ............ *G06V 10/145* (2022.01); *G06V 10/60* (2022.01); *G02B 5/20* (2013.01); *G06T 2207/10048* (2013.01); *G06T 2207/20081* (2013.01); *G06T 2207/20084* (2013.01)

(56) References Cited

U.S. PATENT DOCUMENTS

| | | |
|---|---|---|
| 2007/0206098 A1* | 9/2007 | Matsuo .............. G06V 40/1312 348/207.99 |
| 2008/0107309 A1 | 5/2008 | Cerni |
| 2009/0046903 A1 | 2/2009 | Corcoran et al. |
| 2015/0302264 A1 | 10/2015 | Higuchi et al. |
| 2015/0356339 A1* | 12/2015 | Demos .................. H04N 23/74 348/77 |
| 2019/0065710 A1 | 2/2019 | Hama et al. |
| 2019/0120689 A1 | 4/2019 | Leem et al. |
| 2020/0265247 A1 | 8/2020 | Musk et al. |

FOREIGN PATENT DOCUMENTS

| | | |
|---|---|---|
| EP | 1789908 B1 | 10/2013 |
| EP | 2848196 A1 | 3/2015 |
| JP | 2016-067778 A | 5/2016 |
| JP | 2019-015598 A | 1/2019 |
| JP | 2019040472 A | 3/2019 |
| JP | 2020123068 A | 8/2020 |
| KR | 20070050860 A | 5/2007 |
| KR | 20080070617 A | 7/2007 |
| WO | 2017082100 A1 | 5/2017 |

OTHER PUBLICATIONS

Office Action received in related KR Application No. 10-2021-0132217, dated Sep. 25, 2023, in 17 pages, with translation.

* cited by examiner

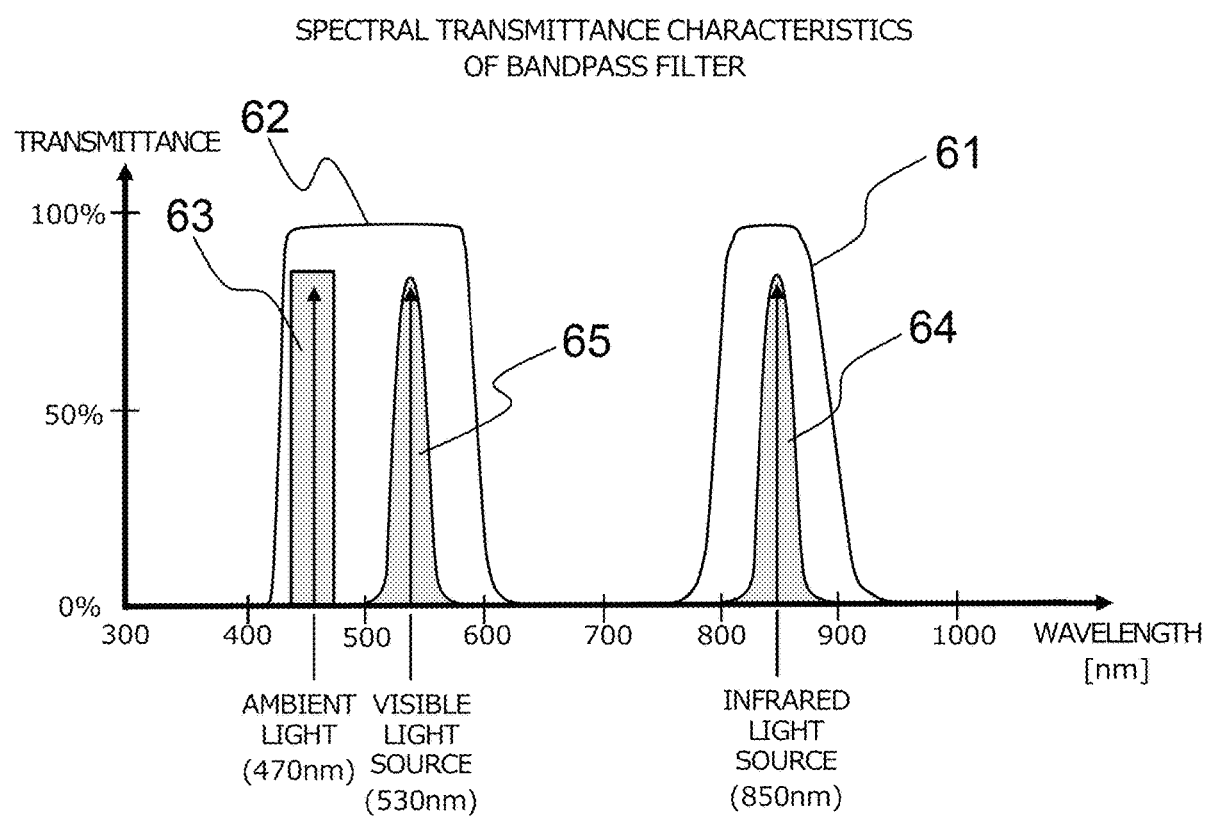

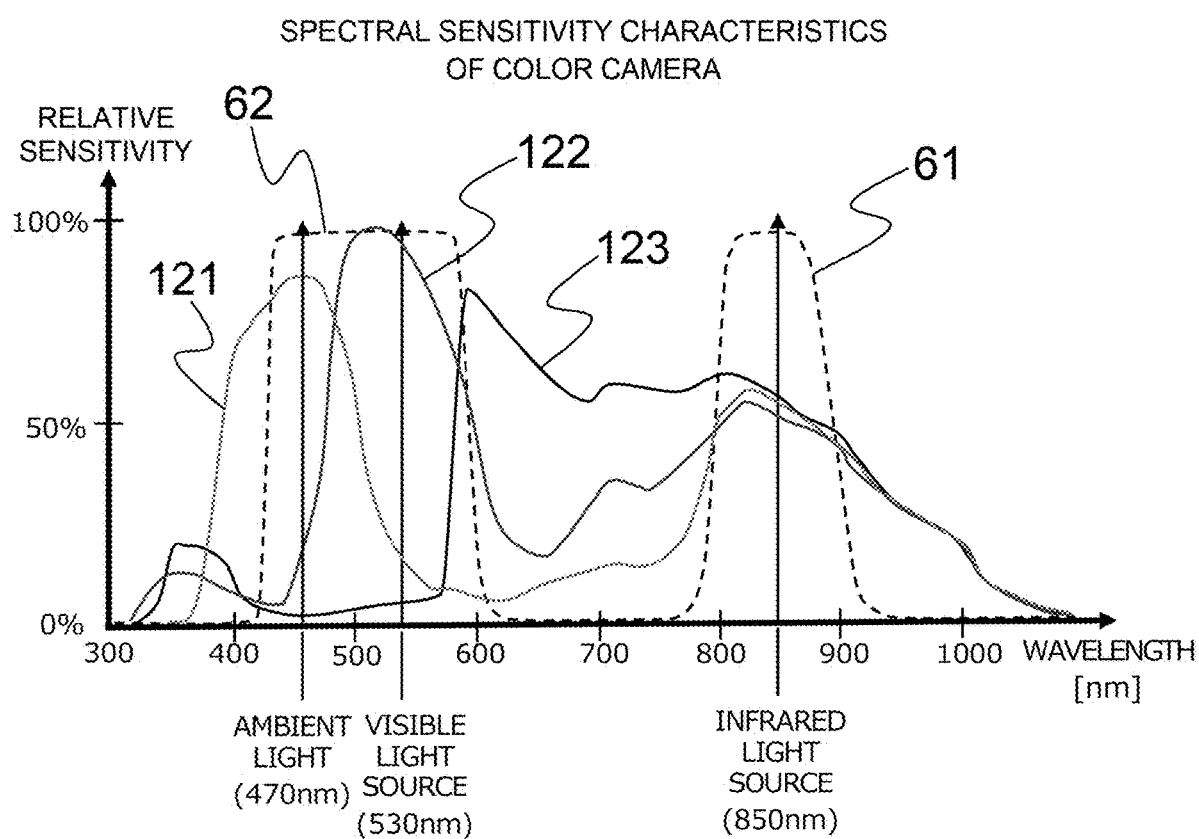

BIOMETRIC AUTHENTICATION DEVICE AND BIOMETRIC AUTHENTICATION METHOD

BACKGROUND OF THE INVENTION

1. Field of the Invention

The present invention relates to a biometric authentication device and a biometric authentication method that authenticate an individual using biometric information.

2. Description of Related Art

Among the various biometric authentication technologies, finger vein authentication is known for its high authentication accuracy. Finger vein authentication uses the complex blood vessel patterns inside the finger to achieve high authentication accuracy, and is more difficult to forge or tamper with than fingerprint authentication, thus providing a high level of security.

In recent years, cashless payment methods, such as Quick Response (QR) code payments linked to personal smartphones, are becoming popular in retail stores such as convenience stores and restaurants. These payment methods are highly convenient because they do not require cash payment, and they can also be linked to various point services to increase customer motivation to buy, which is a great advantage for stores. On the other hand, there is a risk that payment cannot be made if the smartphone is forgotten, broken, or lost, or if the smartphone is stolen and used by someone else. In contrast to this, biometric payment systems that use the user's own biometric data to make payments are beginning to be widely considered and are gradually being put to practical use.

In biometric payment, a user's finger, hand, face, or other biometric information is held over a biometric terminal, which is checked against the user's pre-registered biometric information, and payment is completed when the user's identity is verified. In particular, biometric authentication using a finger is often performed by placing the finger on the finger rest provided on the terminal, but since the size of the device and the finger may not match, or some users may not want to touch the terminal, it is desirable to be able to perform non-contact authentication. In this case, the upper part of the device is designed to be open, but when the biometric is captured by a camera, it is affected by the lighting environment in which the terminal is installed, and in particular, if there is unwanted ambient light, the biometric may not be scanned correctly. In the case of non-contact, it is also important to clearly indicate where and how to hold the living body.

Therefore, in order to realize a contactless biometric authentication device, it is a technical problem to provide a technology that is not easily affected by the installation environment of the terminal, to provide a means of guiding the presentation of the biometric that is intuitively easy to understand, and to provide a technology that can correctly perform authentication even if the position or posture of the biometric is shifted when it is held over the terminal.

With regard to prior art regarding methods for reducing the effects of ambient light, JP-A-2019-040472 (PTL 1) describes a technique for correctly discriminating between light from the device light source and ambient light when authenticating with palm veins, and JP-A-2020-123068 (PTL 2) describes a technique for performing background separation processing when authenticating with finger veins and finger epidermis.

Patent Literature 1 (PTL 1): JP-A-2019-040472
Patent Literature 2 (PTL 2): JP-A-2020-123068

SUMMARY OF THE INVENTION

In contactless finger authentication using the biometric features of the finger, technology for sensing the biometric without being affected by ambient light and technology for guiding the holding of the finger are required. In particular, when unwanted ambient light such as sunlight shines into the environment around the device, strong light is reflected from the ceiling and walls of the room, and unwanted objects are reflected in the background of the finger, making it impossible to implement the detection process of the shooting position and posture of the finger correctly, which results in degradation of authentication accuracy.

JP-A-2019-040472 (PTL 1) discloses a technology to determine whether the luminance is increased by ambient light or by too strong illumination of the device when there is an area of high luminance in the captured image, although the illumination for vein photography needs to be properly adjusted for biometric authentication using palm veins. However, there is no mention in JP-A-2019-040472 (PTL 1) of a technology to solve the problem of failing to detect a biometric information due to the reflection of an unwanted subject in the background of the living body by ambient light.

JP-A-2020-123068 (PTL 2) discloses a technique for separating the hand area from the background area in biometric authentication using finger veins and finger epidermis by judging the area with the smallest luminance difference in the images separated by RGB colors as the background. However, the background separation disclosed in JP-A-2020-123068 (PTL 2) only works correctly when the ambient light is of a specific wavelength and intensity, and there is no mention of a background separation technique that can be implemented in a variety of environments.

The above-mentioned problems are not limited to fingers, but also apply to various other living organisms such as the user's palm, back of the hand, and face. Thus, the conventional technology cannot correctly detect the position and posture of a living body under various ambient light environments in biometric authentication using various living bodies including multiple fingers, which leads to a decrease in authentication accuracy.

It is an object of the present invention to provide a biometric authentication device and a biometric authentication method capable of realizing highly accurate authentication even when variations occur in the ambient light environment during biometric imaging.

A preferred example of a biometric authentication device of the present invention includes: an image capturing unit that captures images of a living body through an optical filter that transmits light in a band including a first wavelength that irradiates the living body, light in a band including a second wavelength that is different from the first wavelength that irradiates the living body, and light in a band including a third wavelength that is different from the first and second wavelengths caused by the external environment, and blocks other wavelengths; a spectroscopic processing unit that separates and acquires an image of the light intensity of the first wavelength, an image of the light intensity of the second wavelength, and an image of the light intensity of the third wavelength from the obtained image of the living body; a background removal unit that extracts a background region from the image of the light intensity of the third wavelength and removes the background region from the images of the light intensity of the first and second wavelengths, respectively; and an authentication processing unit that extracts various features of the living body from the images of the light intensity of the first and second wavelengths with the background area removed, matches them with the biometric features for each individual registered in advance, calculates the degree of similarity for each biometric feature, and performs biometric authentication to identify the individual based on the degree of similarity of the various biometric features.

Further, as other characteristics of the present invention, in the biometric authentication device, the background removal unit is equipped with a neural network that has been learned by preparing a large number of image data separating images of light intensities of the first, second, and third wavelengths from images taken of a living body obtained by presenting the living body a large number of times in the learning process in advance, and range images of correct answers measured by a range sensor installed alongside the image capturing unit as teacher data; and the images of the light intensities of the first, second, and third wavelengths of the subject separated by the spectroscopic processing unit are input to the neural network to estimate the range image of the presented living body, and then the background removal unit extracts the background region from the range image, and removes the background region from the images of the light intensities of the first and second wavelengths, respectively.

Further, a preferred example of a biometric authentication method of the present invention includes: an image capturing unit captures an image of a living body held up by a user, through an optical filter that transmits light in a band including a first wavelength that irradiates the living body, light in a band including a second wavelength that is different from the first wavelength that irradiates the living body, and light in a band including a third wavelength that is different from the first and second wavelengths caused by the external environment, and blocks other wavelengths; a spectroscopic processing unit separates and acquires an image of the light intensity of the first wavelength, an image of the light intensity of the second wavelength, and an image of the light intensity of the third wavelength from the obtained image of the living body; a background removal unit extracts a background region from the image of the light intensity of the third wavelength and removes the background region from the images of the light intensity of the first and second wavelengths, respectively; and an authentication processing unit extracts various features of the living body from the images of the light intensity of the first and second wavelengths with the background area removed, matches them with the biometric features for each individual registered in advance, calculates the degree of similarity for each biometric feature, and performs biometric authentication to identify the individual based on the degree of similarity of the various biometric features.

The present invention makes it possible to achieve highly accurate authentication even when unnecessary subjects are reflected during biometric imaging.

BRIEF DESCRIPTION OF THE DRAWINGS

FIG. 3 illustrates the spectral transmittance characteristics of the bandpass filter for the first embodiment;

FIG. 6 shows a schematic diagram of the spectral sensitivity characteristics of the camera for the first embodiment;

DESCRIPTION OF EMBODIMENTS

Figure 1A:
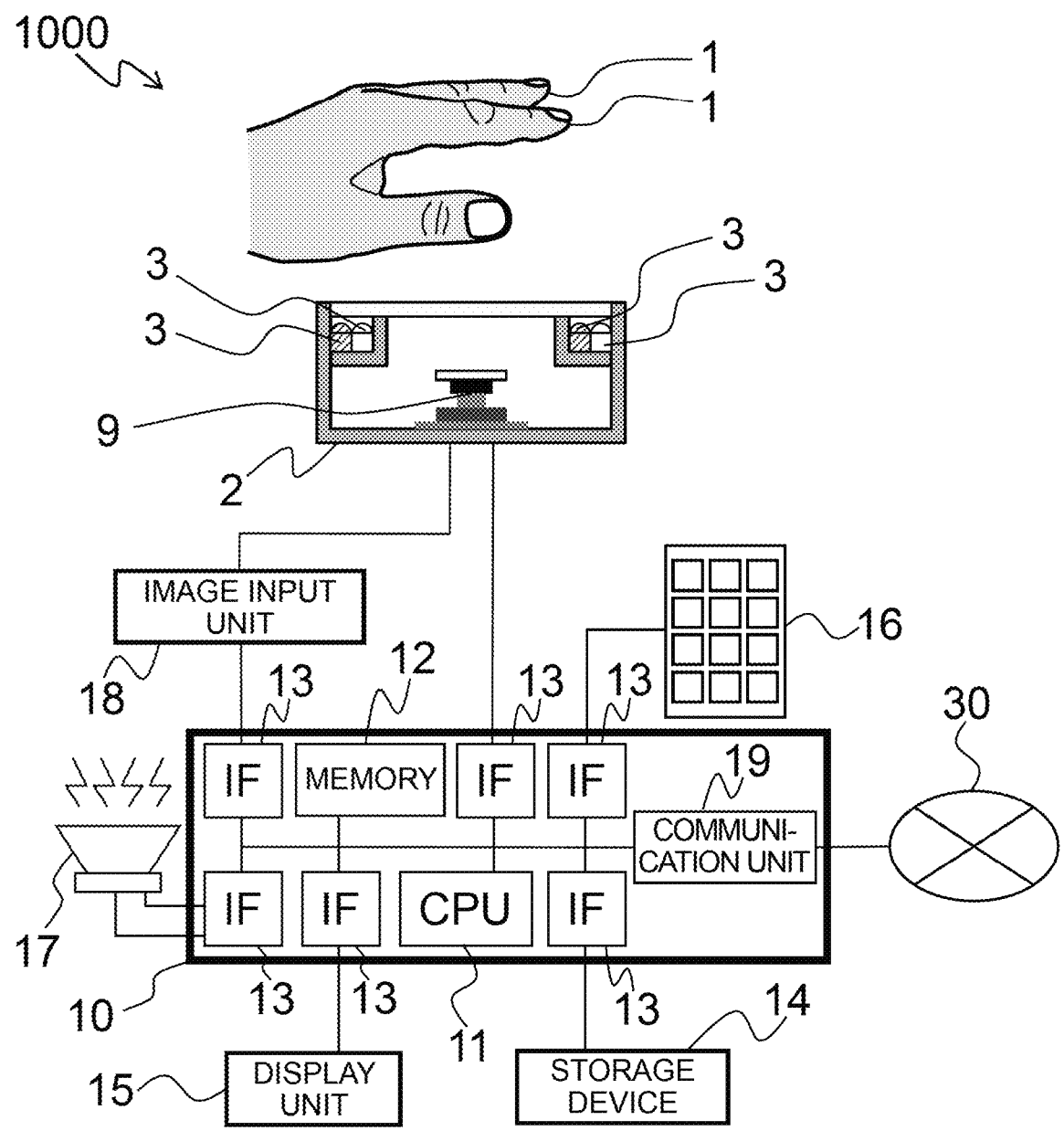
FIG. 1A shows the overall structure of the biometric authentication system for a first embodiment.

The embodiments of the present invention are described below with reference to the drawings. The following description and drawings are examples for explaining the present invention, and omissions and simplifications are made as appropriate for clarification of the description. The present invention can also be implemented in various other forms. Unless otherwise limited, each component may be singular or plural.

The position, size, shape, range, etc. of each component shown in the drawings may not represent the actual position, size, shape, range, etc. in order to facilitate understanding of the invention. Therefore, the present invention is not necessarily limited to the position, size, shape, range, etc. disclosed in the drawings.

In addition, although the following description may describe processing performed by executing the program, the program may be executed by a processor (e.g., CPU (Central Processing Unit), GPU (Graphics Processing Unit)) to perform the defined processing. Since it is performed while using storage resources (e.g., memory) and/or interface devices (e.g., communication ports), etc. as appropriate, the processor may be considered to be the main body of the processing. Similarly, the subject of the processing to be performed by executing the program may be a controller, device, system, computer, or node having a processor. The processing entity that executes the program may be an arithmetic unit, and may include a dedicated circuit (e.g., FPGA (Field-Programmable Gate Array) or ASIC (Application Specific Integrated Circuit)) that performs specific processing.

In the present specification, biometric features mean different anatomical biological features such as finger veins, fingerprints, joint patterns, skin patterns, finger contour shapes, fat lobule crests, length ratio of each finger, finger width, finger area, melanin patterns, palm veins, palm prints, back of hand veins, facial veins, ear veins, or face, ear, iris, etc.

First Embodiment

FIG. 1A shows an example of the overall configuration of a biometric authentication system 1000 that uses the biometric features of the fingers of a hand in the present embodiment. It goes without saying that the configuration of the present embodiment is not a system, but may be configured as a device with all or part of the configuration mounted on a chassis. The device may be a personal authentication device that includes authentication processing, or it may be a finger image acquisition device or finger feature image extraction device that specializes in acquiring finger images while authentication processing is performed outside the device. It may also be implemented as a terminal. A configuration with at least an imaging unit that captures images of a living body and an authentication processing unit that processes the captured images and authenticates the living body is called a biometric authentication device.

The biometric authentication system 1000 shown in FIG. 1A includes an input device 2, which is an imaging unit, an authentication processing device 10, a storage device 14, a display unit 15, an input unit 16, a speaker 17, and an image input unit 18. The input device 2 includes an image capturing device 9 installed inside a housing, which may include light sources 3 installed in the housing. The authentication processing device 10 has an image processing function.

The light sources 3 are, for example, light emitting devices such as LED (Light Emitting Diode), and irradiate light to the finger 1 presented above the input device 2. The light sources 3 may be capable of irradiating various wavelengths depending on the implementation, and may be capable of irradiating light that penetrates a living body or reflected light from a living body.

The image capturing device 9 captures the image of the finger 1 presented to the input device 2. At the same time, it may capture images of the face, iris, back of the hand, palm, or other living body. The image capturing device 9 is an optical sensor capable of capturing multiple wavelengths of light, and may be a color camera, or a multispectral camera capable of simultaneously capturing ultraviolet or infrared light in addition to visible light. It can also be a range finding camera that can measure the range of a subject, or a stereo camera that combines multiple cameras of the same type. The input device 2 may include multiple such image capturing devices. Furthermore, the fingers 1 may be multiple and may include multiple fingers of both hands simultaneously.

The image input unit 18 acquires images captured by the image capturing device 9 in the input device 2 and outputs the acquired images to the authentication processing device 10. For example, various reader devices (e.g., video capture board) for reading images can be used as the image input unit 18.

The authentication processing device 10 consists of a computer including, for example, a central processing unit (CPU) 11, a memory 12, various interfaces (IF) 13, and a communication unit 19. The CPU 11 realizes each functional unit such as authentication processing unit by executing a program stored in the memory 12.

Figure 1B:
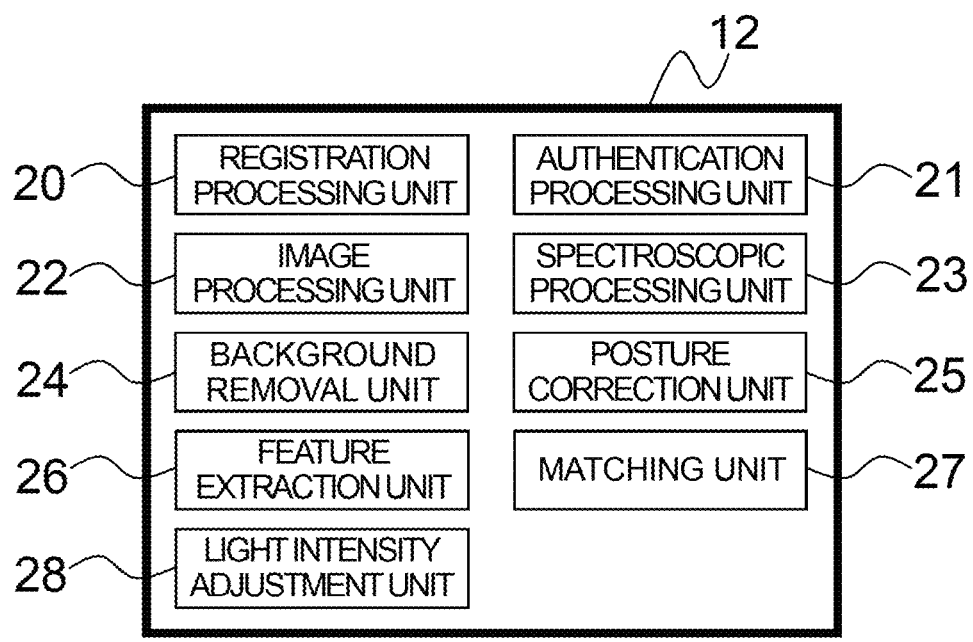
FIG. 1B shows an example of the functional structure of the program stored in the memory for the first embodiment.

FIG. 1B shows an example of the functional structure of the program stored in the memory 12 to realize each function of the authentication processing device 10. As shown in FIG. 1B, the authentication processing device 10 consists of the following processing blocks: the registration processing unit 20, which registers the biometric features of an individual in advance by linking them with the individual ID; the authentication processing unit 21, which authenticates the biometric features extracted from the currently captured image based on the registered biometric information and outputs the authentication result; the image processing unit 22, which removes noise and detects the position of the living body for the input image; the spectroscopic processing unit 23, which separates the images of multiple wavelengths into images of different wavelengths; the background removal unit 24, which removes unnecessary objects that appear in the background of the living body; the posture correction unit 25, which guides the user so that the living body is in a posture suitable for authentication and corrects the posture variation of the living body; the feature extraction unit 26, which extracts the biometric features during registration and authentication processes; the matching unit 27, which compares the similarity of the biometric features; and the light intensity adjustment unit 28, which appropriately adjusts the intensity of the irradiation light of each light source of the input device. These various processes will be described in detail later. The memory 12 stores the program to be executed by CPU 11. The memory 12 also temporarily stores images and other data input from the image input unit 18.

The interface (IF) 13 connects the authentication processing device 10 to external devices. Specifically, the interface 13 is a device with ports, etc. for connecting to the input device 2, the storage device 14, the display unit 15, the input unit 16, the speaker 17, and the image input unit 18, etc.

The communication unit 19 is used by the authentication processing device 10 to communicate with external devices via the communication network 30. The communication unit 19 is a device that performs communication according to the IEEE 802.3 standard if the communication network 30 is a wired LAN, and a device that performs communication according to the IEEE 802.11 standard if the communication network 30 is a wireless LAN.

The storage device 14 consists of, for example, HDD (Hard Disk Drive) or SSD (Solid State Drive), and stores registration data of users and other data. The registration data is information for verifying the user obtained during the registration process, and is, for example, image data such as finger vein patterns and biometric feature data associated with the registrant ID. The finger vein pattern image is an image of the finger veins, which are blood vessels distributed under the skin of the finger, captured as a dark shadow pattern or a slightly bluish pattern. The feature data of the finger vein pattern is a binary or 8-bit image of the veins, or feature data generated from the coordinates of feature points such as vein bends, branches, and end points, or from the luminance information around the feature points.

The display unit 15 is, for example, a liquid crystal display, and is an output device that displays the information received from the authentication processing device 10 and the posture guidance information and posture determination results of the living body. The input unit is, for example, a keyboard or a touch panel, and transmits the information input by the user to the authentication processing device 10.

The display unit 15 may also have an input function such as a touch panel. The speaker 17 is an output device that transmits information received from the authentication processing device 10 in the form of an acoustic signal, for example, voice.

Figure 2A:
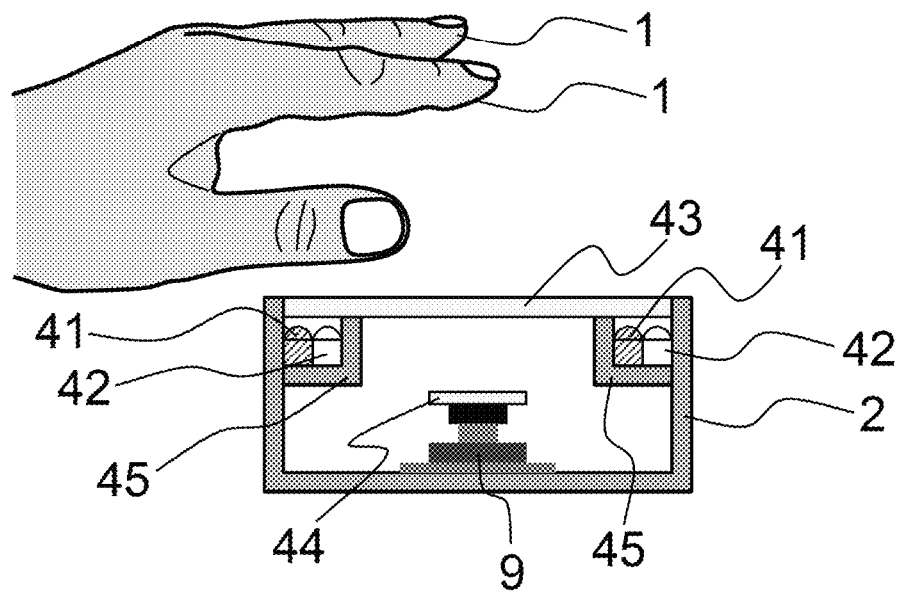
FIG. 2A shows a cross-sectional view of the input device.
Figure 2B:
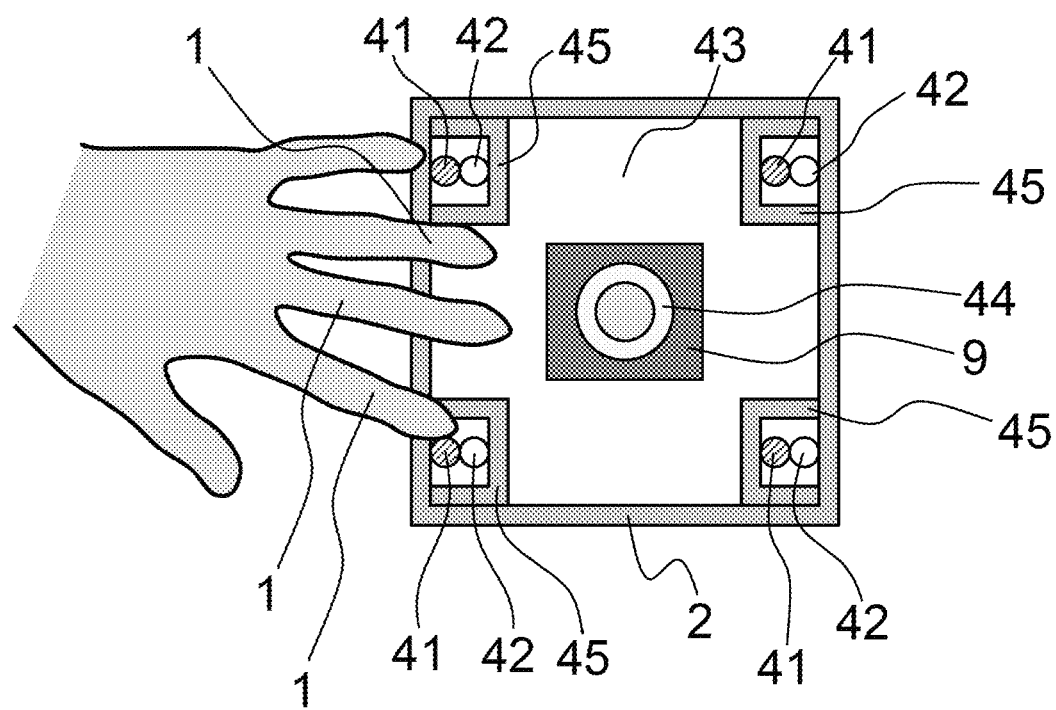
FIG. 2B shows a top view of the input device, according to the first embodiment.

FIGS. 2A and 2B show a cross-sectional view (FIG. 2A) and a top view (FIG. 2B) of the input device 2 detailed in the present embodiment. Visible light sources 41 and infrared light sources 42 are provided at the top of the housing as corresponding light sources 3 for photographing a living body, and visible light and infrared light are emitted from each light source to the finger 1. Visible light and infrared light, for example, are light with center wavelengths of 530 nm and 850 nm, respectively. These two wavelengths of light are reflected, absorbed, and scattered on and under the surface of the finger 1, and then reach the input device 2 as reflected light.

Visible light is mainly used to capture fine wrinkles on the skin surface, fingerprints, finger joint wrinkles, and speckled features caused by fat lobules and melanin patterns, while infrared light is mainly used to capture subcutaneous vascular features. Therefore, it is not limited to the central wavelength or the number of wavelength types described in the present embodiment, but can be set arbitrarily within the range of combinations of multiple wavelengths appropriate for capturing the biometric features adopted for use. As shown in the present embodiment, a device configuration that irradiates lights of two wavelengths can increase the variation of biometric features that can be captured compared to a device that irradiates light of one wavelength, and since the device configuration is not greatly complicated, authentication accuracy can be dramatically improved with a relatively simple configuration.

The light reflected by the finger 1 passes through a top cover 43 of the device and also passes through a bandpass filter 44 to reach the camera (image capturing device) 9. The device's top cover 43 is made of a material transparent to visible and infrared light, and protects the device from dust from outside. The bandpass filter 44 has the property of passing at least the irradiated light of the visible light source 41 and the infrared light source 42, and of passing a specific part of the wavelength band that is not emitted from said light sources 41,42, and blocking light of other wavelengths. This property will be described later. The top cover 43 of the device can have the optical characteristics of the bandpass filter 44. In that case, the device top cover 43 can have the effect of visually covering the internal structure of the device. The camera 9 in the present embodiment is assumed to be a color camera having a CMOS sensor array with three wavelengths of RGB and those sensors having high infrared sensitivity, but it is not limited to this.

The visible light source 41 and the infrared light source 42 are surrounded by a light-shielding component 45. If light from the light sources directly irradiates the inside of the device, structures inside the device may be reflected in the camera, or smear noise or ghosting may occur, resulting in unwanted noise on the image. Therefore, a light-shielding component 45 can be provided to prevent the entry of unnecessary light and improve image quality.

In order to uniformly irradiate multiple fingers presented on the top of the input device, the visible light source 41 and infrared light source 42 are placed at the four corners of the device in the configuration of the present embodiment, and each of them can independently adjust the intensity of light emission. This makes it possible to irradiate the finger, which is the subject of the image, with optimal brightness without any unevenness over the entire area, thus enabling high quality imaging of the living body. In addition, the light sources are not limited to the four corners, but can be arranged in concentric circles with the camera 9 at the center, or can be arranged all around as a surface light source.

FIG. 3 is a schematic diagram showing an example of the spectral transmittance characteristics of the bandpass filter 44 and an example of the emission intensity characteristics of the visible light source 41 and the infrared light source 42. The bandpass filter in the present embodiment is a two-bandpass filter configuration that passes wavelengths in two bands and blocks wavelengths in the other bands. One of the bands to be passed is the infrared light transmission band 61, which passes light in the wavelength range of approximately 800 nm to 900 nm, including 850 nm, which is the center wavelength of the infrared light source 42 with the characteristics shown in the emission intensity characteristics 64 of the infrared light source. The other passband is the visible light transmission band 62, which is generally from 430 nm to 600 nm, including 530 nm, which is the central wavelength of the visible light source 41 with the characteristics shown in the emission intensity characteristic 65 of the visible light source, and this band generally transmits blue to green light. And, the bandpass filter blocks light of other wavelengths. Blocking light of other wavelengths has the effect of improving image quality because light components unnecessary for photographing the living body are removed.

Furthermore, comparing the visible light transmission band 62 shown in FIG. 3 with the emission intensity characteristics 65 of the visible light source, it is designed to also transmit the wavelength band from 420 nm to 500 nm, which is the wavelength that the visible light source 41 cannot emit. In other words, the bandpass filter 44 has an ambient light transmission band 63, which is a band that passes a part of the other wavelength band in addition to the two wavelengths emitted by the device light sources. In particular, the light transmitted through the ambient light transmission band 63 is light that is not emitted from the light sources equipped in the device, i.e., light emitted from the light source that is mainly caused by the environment in which the device is installed, i.e., ambient light is captured. The method of detecting ambient light will be described later.

Figure 4:
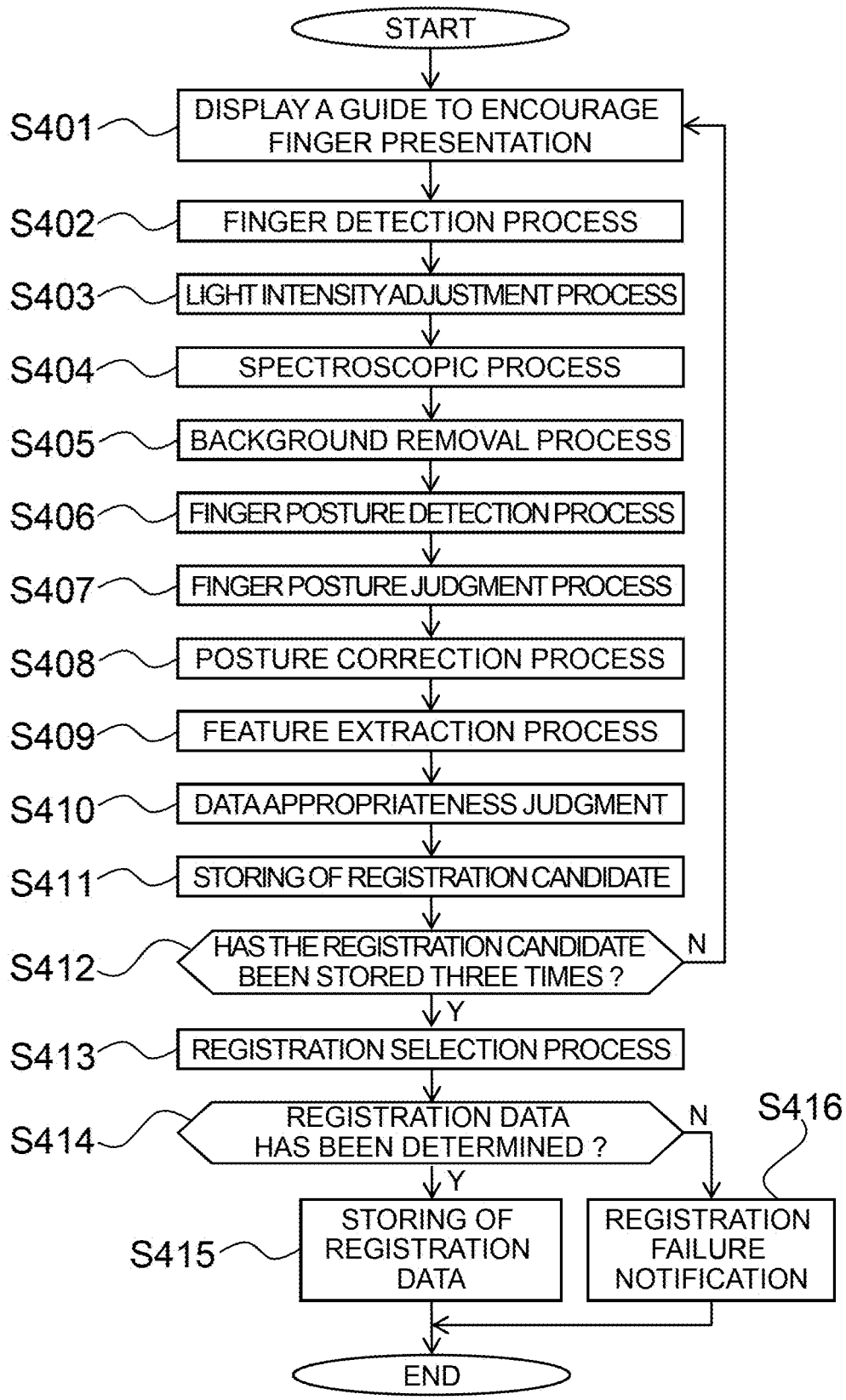
FIG. 4 shows an example of the process flow of the registration processing unit of the biometric authentication system for the first embodiment.
Figure 5:
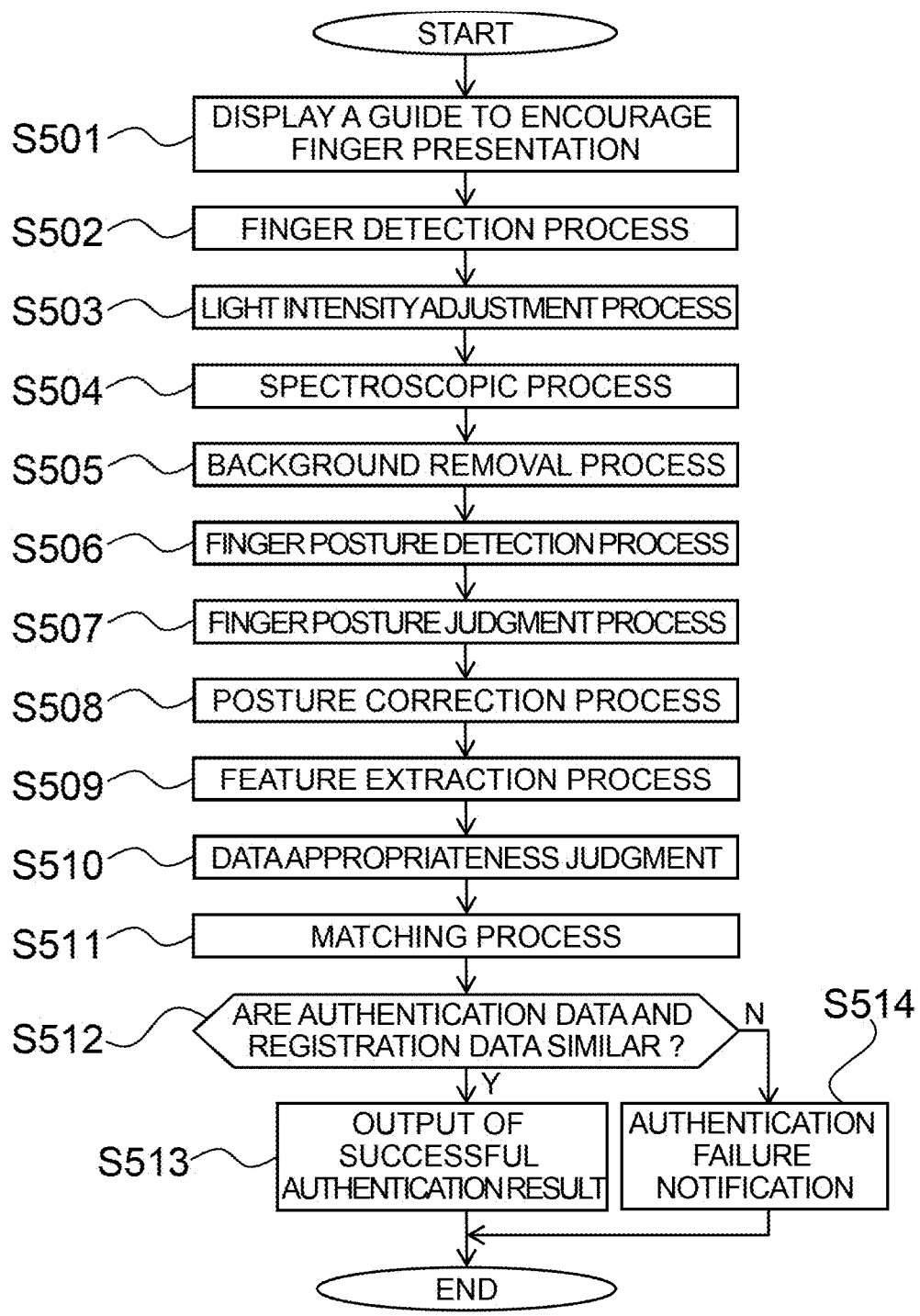
FIG. 5 shows an example of the process flow of the authentication processing unit of the biometric authentication system for the first embodiment.

FIG. 4 and FIG. 5 show an example of the schematic flow of the registration and authentication processes of the biometric authentication technology using the personal characteristics of a finger described in the present embodiment, respectively. These registration and authentication processes are realized, for example, by a program executed by the CPU 11 of the authentication processing device 10 described above. In the present embodiment, it is assumed that three fingers are to be photographed, but it may be one finger or any other number of fingers.

Initially, the flow of the registration process shown in FIG. 4 will be explained. The registration processing unit 20 is activated by the user's instruction for the registration process, and first, the system displays a guide on the display unit 15 to prompt the user to present fingers, and the user follows the guide and holds the finger 1 over the input device 2 (S401). As an example of the guide displayed on the display unit 15, the ideal way of holding up three fingers can be illustrated, and a sentence such as "Please hold up three fingers" can be displayed. The user can then follow the guide and place his or her fingers on the top of the input device 2. In the present embodiment, it is assumed that the fingers are held slightly above the device, but they can also be physically touched by a finger resting area. The guide can be displayed not only on the display, but also on a separate light source for guiding, which can be irradiated on the finger 1 to guide it by its color or blinking pattern. At that time, for example, it can be expressed in red if the finger is not held at the appropriate distance or position, and in blue if the finger is held appropriately. Alternatively, a voice may be used to indicate whether the fingers have been held at an appropriate position or not.

Next, a finger detection process is performed to confirm that fingers have been held over the top of the input device (S402). As an embodiment of this process, fingers can be determined to be present when the average luminance of the preset partial area near the center of the image exceeds a certain value by taking a image while lighting the visible light source 41 or infrared light source 42 at a predetermined intensity. At this time, the light source can be blinked to alleviate the effect of ambient light, and the presence of fingers can be determined from the difference image of the two light and dark images.

Next, the light intensity adjustment unit 28 is activated to perform the light intensity adjustment process to adjust the intensity of the irradiated light of the visible light source 41 and the infrared light source 42 appropriately (S403). In the present embodiment, the camera is a color camera and is capable of simultaneously capturing the wavelengths of both the visible light source 41 and the infrared light source 42. Therefore, in an aforementioned predetermined partial area near the center of the image, the light intensities of the light sources at the respective locations and wavelengths are controlled so that no white skipping or black crushing occurs in the pixel values of the area when both wavelengths are irradiated simultaneously and the light intensities of the two wavelengths are balanced to the same degree. This ensures that both images of the two wavelengths obtained in the spectroscopic processing in the later stage are taken with appropriate brightness. The light intensity adjustment process can be performed after the finger posture detection (S406) in the later step. In that case, since the position of the finger is detected, it is possible to control the light source individually so that the entire finger is illuminated uniformly. Similarly, the light intensity adjustment process may include the finger posture detection process, in which case it may be performed at high speed with a more simplified finger posture detection process.

Next, the spectroscopic processing unit 23 is activated to perform spectroscopic processing to separate multiple wavelengths of light captured simultaneously by each wavelength (S404), and the background removal unit 24 is activated to perform background removal processing to extract only the finger part from the captured image based on the result of the spectroscopic processing (S405). The details of these processes will be described later.

Then, the finger posture detection process is performed to retrieve information on the fingertips, finger roots, and finger widths of multiple fingers from the video of only the fingers (S406). As an embodiment of acquiring the positions of the multiple fingertips and finger roots, the contour of the finger area with the background removed is first acquired, the curvature of the inside of the finger area is determined by tracking on the contour line, and the part of the finger area that is convex and has the highest curvature of the contour line is determined to be the fingertip. Similarly, the part of the finger area that is concave and has the highest curvature is determined to be the interdigital area. As an embodiment of how to determine the finger width, the midpoint of the line connecting the two interdigital areas on both sides of the finger is defined as the finger root, the line segment connecting the fingertip and the finger root of the finger is defined as the central axis of the finger, and the distance between the two points where the line passing through the midpoint of the central axis and orthogonal to the central axis intersects the finger contour line of the finger is defined as the width of the finger.

Next, finger posture judgment is performed to determine that the finger is properly held up (S407). In the finger posture judgment, based on the results of the aforementioned finger posture detection process, it is judged that the finger is present in an appropriate position or that the finger is stationary for a certain period of time. As an embodiment of finger resting detection, it is sufficient to confirm that the finger posture information such as the position of the fingertip does not change over time. Since it is difficult to keep the finger completely still, the finger may be judged to be stationary if it is within a certain range of movement. If the finger is still not stationary, or if the finger is too far away from the camera and the hand looks too small, or if the posture is not appropriate, a guide is displayed to that effect, and the process returns to the process (S401) to prompt the user to present the finger again, although the illustration is omitted.

Next, the posture correction unit 25 is activated to perform the posture correction process to normalize the thickness and orientation of all detected fingers (S408). In the present embodiment, it is assumed that ROI (Region of Interest) images are acquired by cutting out all the detected fingers as one image for each finger. The ROI image shall be generated by including a point at the fingertip of each finger and two points at the interdigital area on both sides of each finger inside, rotating the finger so that its central axis is parallel to the horizontal axis of the image, and scaling the image so that the finger width of each finger is a constant value. In this way, the orientation and thickness of all fingers in the ROI images are unified. Based on this method, the posture of the fingers can be corrected. The ROI image of each finger can be acquired in two types: visible light image and infrared light image, but since the images of both wavelengths are basically taken at the same time, once the cropping position, rotation amount, and magnification amount for generating the ROI image are determined in the image of one wavelength, the result can be used as it is in the image of the other wavelength. If the cropping position, rotation, and magnification are determined in one of the images, the result can be used in the other image.

Then, the feature extraction unit 26 is activated to perform the feature extraction process, which extracts epidermal features including skin wrinkle patterns, fat and melanin patterns from visible light images and vein features from infrared light images (S409). These biometric features can be acquired by enhancing biometric features such as line pattern features of epidermis and blood vessels and speckles features of fat lobules by filtering processes such as general edge-enhancement filters, Gabor filters, matched filters, etc., and then binarizing or tri-valued processing the results. The biometric features can also be acquired by extracting luminance gradient features from key points such as SIFT (Scale-Invariant Feature Transform) features. In any case, any feature that can extract biometric features from images and calculate their similarity to each other is acceptable.

Then, a data appropriateness judgment is performed to detect that the extracted pattern is appropriate and that the photographed finger is not a foreign object or counterfeit (S410). If the judgment result is inappropriate, the system returns to the process (S401) of prompting the user to present the finger again (the illustration is omitted in FIG. 4), but if the judgment result is appropriate, the extracted feature data is stored as a candidate for registration (S411). As an embodiment of the data appropriateness judgment process, if a pattern with high continuity even though it is a line feature such as a blood vessel pattern cannot be extracted, or if a strong edge that is never observed in a real finger is observed in the original image, the pattern extraction fails or a counterfeit is input. If a strong edge is observed in the original image, which is not observed in the finger, it can be dismissed as pattern extraction failure or counterfeit input. Alternatively, the pulsation of the image brightness due to changes in the blood flow of the finger can be detected in the video image, and if no pulsation can be detected, the method can be rejected.

Then, these steps (S401 to S411) are repeated to determine if the registration candidates have been accumulated three times (S412), and if they have been accumulated three times, the registration selection process is performed (S413). As an embodiment of the registration selection process, there is a method that calculates the degree of similarity between each candidate by matching the feature data of the three registration candidates in a brute force manner, and selects the registration candidate with the highest sum of the similarities of two other candidates as the registration data. According to this method, the stable feature data that is most easily reproduced among the three shots is registered, thus improving the authentication accuracy.

However, if the similarities between the selected registration data and the other two candidates are both values that are not considered to be the same pattern, it is assumed that the three registration candidates were all unstable biometric features and no registration data was determined. Following the registration selection process (S413), it judges whether one feature data that is considered suitable for registration has been determined or not (S414), and if it has been determined, the registration processing unit 20 stores that feature data in the storage device 14 as registration data linked to the registrant ID entered by the registrant at the start of the registration process (S415), and if not, the registration processing unit reports the status of the registration failure (S416). In case of registration failure, the registration process may be repeated several times.

The flow of the authentication process shown in FIG. 5 is explained next. The authentication process is a process in which a user who has already registered his or her personal biometric information through the registration process has the biometric authentication system 1000 authenticate the user as the registered user himself or herself. In the authentication process, the system takes an image of the living body presented by the user, extracts the features of the living body, and checks them against the feature data of the registrant data. If there is registrant data that can be judged to be the user, the system outputs the successful authentication result and the registrant ID. If there is no registrant data that can be determined to be the user himself/herself, an authentication failure notice is output.

The authentication processing unit 21 is activated by the user's instruction for the authentication process, and the process from the display of the guide that prompts the user to present fingers (S501) to the judgment of data appropriateness (S510) is same as the registration process in FIG. 4, so the explanation is omitted.

Then, the matching unit 27 is activated to sequentially match (S511) the authentication data acquired through feature extraction from visible and infrared light images (S509) with one or more registration data (usually assuming that multiple registrants are registered) registered in the storage device 14 in advance.

In the matching process, the similarity of the extracted epidermal and venous features with the registered data (epidermal and venous features of one registered data) is calculated, respectively. This section describes an embodiment of the aforementioned similarity calculation. First of all, in the present embodiment, both the registration data and the authentication data are assumed to have biometric feature data for three fingers, where the corresponding pairs of fingers are determined based on the detected finger positions, and the aforementioned similarity is calculated for the fingers of the pair. The similarity is calculated by comparing the biometric features of the same biological parts. In this case, two similarities, one for epidermal features and one for venous features, are calculated for each of the three finger pairs, so a total of six similarities are obtained for one registration data.

In the present embodiment, the six similarities are regarded as six-dimensional scores, and a database is constructed in which a large number of plot points consisting of six similarities obtained by matching multiple authentication data obtained from the same person beforehand, and a large number of plot points consisting of six similarities obtained by matching multiple authentication data obtained from different persons beforehand, are recorded in six-dimensional space. Then, when the set of plotted points of the matching results of multiple authentication data obtained from the same person in the database can be separated from the set of plotted points of the matching results of multiple authentication data obtained from different persons in a 5-dimensional hyperplane, the boundary hyperplane (authentication threshold) between the person's domain and the other person's domain for the 6-dimensional score is calculated based on the ratio of the two sets, for example, by the perceptron.

Then, it judges whether the six-dimensional score obtained by the authentication data matching process is included in the person's domain or not by its positional relationship with the aforementioned boundary hyperplane (authentication threshold), and if it is included in the person's domain, it is judged to be similar to the registration data (S512). If the six-dimensional score is included in the person's domain, it can be judged that the authentication data is similar to the registration data, so the system outputs the result of successful authentication and the registrant ID associated with the registration data (S513), otherwise the system outputs a notification that authentication with all the registration data failed (notification that the system could not authenticate the registrant) (S514).

The method of judging similarity based on the six-dimensional scores illustrated above can be used to judge the identity of a person even if the similarity of one finger is low, if the similarity of the remaining two fingers is high. In addition, even if the similarity of epidermal features has decreased, if the similarity of vein features is high, the person can be judged to be the same person. According to this method, even if the similarity of some finger features is accidentally lost due to, for example, the effect of finger placement or finger injury, the other fingers and the other features will compensate for the overall similarity, which has the advantage that the registrant can be authenticated correctly. Furthermore, the method of determining the judgment criteria based on a large amount of data acquired in advance has the advantage that the criteria themselves can be determined automatically and accurately.

In the matching process, if there is more than one registration data to be matched, the registration data for each case in turn is matched with the authentication data to calculate the six similarities, and after matching with all the registration data, the registration data with the highest total or average value of the six similarities is selected (S511). Then, it is judged whether the selected registration data is similar to the authentication data based on whether the six-dimensional score of the selected registration data is included in the person's domain (S512).

In order to determine whether the authentication data and the registration data are similar, in addition to the method of judging whether or not the six-dimensional score obtained by matching is included in the person's domain based on the relationship with the above-mentioned boundary hyperplane (authentication threshold), the method of determining by the average of the six similarities, or by the average of the two highest values of the average of the two similarities of each finger, can also be used.

As another method of processing S511 to S514 in the flowchart of the authentication process shown in FIG. 5, when there is more than one registration data to be matched in the matching process, six similarities are calculated by sequentially matching one registration data with the authentication data, and the six-dimensional score is judged whether it is included in the person's domain based on the relationship with the above-mentioned boundary hyperplane (authentication threshold), and if it is included in the person's domain, the process ends with an output of successful authentication (registrant ID) for the corresponding registration data. If it is not included in the person's domain, the matching process is repeated by selecting the next registration data, and if authentication is not successful for all the registration data, an authentication failure notification may be output.

This section describes an embodiment of the spectral processing included in the processing flow of FIGS. 4 and 5. FIG. 6 is a schematic diagram showing the spectral sensitivity characteristics of camera 9 and the central wavelength of the light source to be captured. The horizontal axis of the graph is the wavelength, and the vertical axis is an example of the spectral sensitivity characteristics (121, 122, 123) of the blue, green, and red light receiving elements installed in the camera 9, respectively. The emission center wavelengths of visible light source 41 and infrared light source 42 are also shown.

The light transmitted through the band-pass filter 44 contains a total of three wavelengths: two wavelengths from the infrared light source and visible light source installed in the input device 2, plus the wavelength of ambient light originating from the surrounding environment. The light of these wavelengths is mixed and detected simultaneously by the blue, green, and red light receiving elements. Since the amount of light received by the blue, green, and red light receiving elements is the sum of the light intensities of the three wavelengths multiplied by the light receiving elements' photosensitivity, the relationship between the amount of light received by each light receiving element and the light intensity of each wavelength can be described by the following Equation (1). However, let the light-receiving amounts of the blue, green, and red light receiving elements of the color camera are $P_B$, $P_G$, and $P_R$, respectively, and the light intensities of each wavelength are $I_{850}$, $I_{530}$, and $I_{470}$, and the sensitivity to which the light-receiving element E (E={B,G,R}) reacts when it receives light of wavelength $\lambda$ ($\lambda$={470, 530, 850}[nm]), is $WE_\lambda$.

[Equation 1]

$$\left.\begin{array}{l} P_B = WB_{470}*I_{470} + WB_{530}*I_{530} + WB_{850}*I_{850} \\ P_G = WG_{470}*I_{470} + WG_{530}*I_{530} + WG_{850}*I_{850} \\ P_R = WR_{470}*I_{470} + WR_{530}*I_{530} + WR_{850}*I_{850} \end{array}\right\} \quad (1)$$

The vector representation of Equation (1) is as follows. T denotes transposition.

[Equation 2]

$$[P_B P_G P_R]^T = W[I_{470} I_{530} I_{850}]^T \quad (2)$$

[Equation 3]

$$W = [[WB_{470}WG_{470}WR_{470}]T[WB_{530}WG_{530}WR_{530}]^T \\ [WB_{850}WG_{850}WR_{850}]^T] \quad (3)$$

The spectroscopic process is to extract the light intensity $I_\lambda$ of each wavelength separately. In other words, $I_{470}$, $I_{530}$, and $I_{850}$ can be obtained from this simultaneous equation (Equation (1)), respectively. If the inverse matrix of W is $W^{-1}$, the light intensity at each wavelength is as follows.

[Equation 4]

$$[I_{470} I_{530} I_{850}]^T = W^{-1}[P_B P_G P_R]^T \quad (4)$$

In order to obtain the light intensity $I_\lambda$ for each wavelength from the Equation (4), the unknowns $I_{470}$, $I_{530}$, and $I_{850}$ are obtained by reading $P_B$, $P_G$, and $P_R$ in this equation from the pixel values of the captured color image, and the value of W from FIG. 6.

Through this analysis, in addition to the light intensity $I_{850}$ originating from the infrared light source of the device and the light intensity $I_{530}$ originating from the visible light source of the device, the light intensity $I_{470}$ of the ambient light emitted by the light source of the surrounding environment can be obtained, respectively.

FIGS. 7A, 7B, 7C, and 7D show an illustration of background removal when unwanted ambient light is captured when photographing a living body. In general, sunlight such as direct sunlight and western sun, and light from lighting devices such as fluorescent lamps, incandescent lamps, and LEDs are often captured as ambient light. The light spectrum of sunlight contains a wide range of different wavelengths throughout, and incandescent lights also have spectral characteristics similar to sunlight. The spectrum of fluorescent lights and LEDs varies from device to device, but most lights are white, and white LEDs emit light including the blue spectrum. In other words, since most ambient light has a wide range of wavelengths, it often includes a blue component around 470 nm, which is the wavelength transmitted through the aforementioned ambient light transmission band.

Figure 7A:
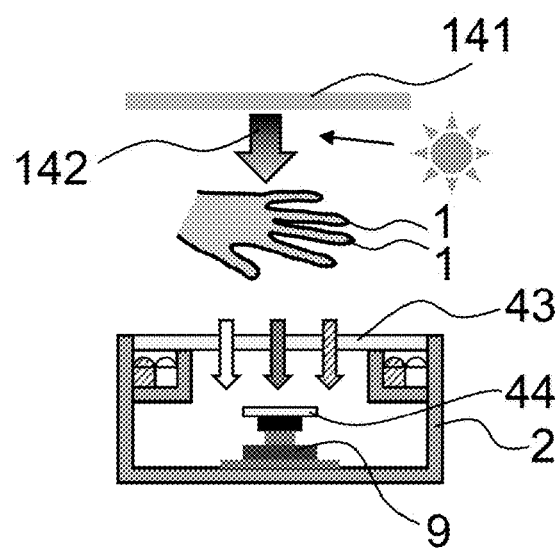
FIGS. 7A, 7B, 7C, and 7D show illustrations of background removal when ambient light is captured, for the first embodiment.
Figure 7B:
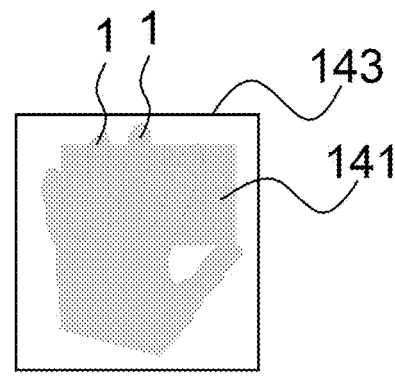

FIG. 7A is a schematic diagram of the light captured by the camera 9 when ambient light 142 is reflected on the ceiling 141. Ambient light is captured by reflecting sunlight on the surrounding environment, for example, but here we assume that the ambient light is reflected on the ceiling. The ambient light 142 is reflected by the ceiling 141, passes through the gap between the fingers 1, passes through the device top cover 43, and further passes through the bandpass filter 44 to reach the camera 9. At this time, due to the characteristics of the bandpass filter 44, only the wavelength components of the visible light transmission band, the infrared light transmission band, and the ambient light transmission band of the ambient light 142 are captured by the camera 9. Also, the visible light source 41 and infrared light source 42 are reflected by the finger 1 and do not reach the ceiling 141 (the amount reflected back can be ignored because of the distance). At this time, in the finger image 143 taken by the camera 9 in an ambient light environment, the part of the finger 1 and the part of the ceiling 141 are both observed brightly as shown in FIG. 7B, and it becomes difficult to distinguish the contour line of the finger from the ceiling part.

Figure 7C:
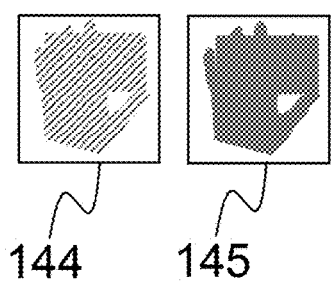

FIG. 7C is an example of a visible light image and an infrared image when a bandpass filter without an ambient light transmission band is equipped. In the case of the bandpass filter without an ambient light transmission band, only the bands of the visible light source and infrared light source are captured, and thus, as shown in the FIG. 7C, spectral images for two wavelengths are obtained. As mentioned above, since ambient light has a broad spectrum, the light illuminating the ceiling area also has light components in the visible and infrared bands. Therefore, when the ambient light is illuminated, the ambient light is captured in a way that is indistinguishable from the visible and infrared light sources. Therefore, when the visible light image 144 and the infrared light image 145 are acquired through spectral processing as described above, both images show the image of the ceiling 141 superimposed on the shape of the hand, making it impossible to distinguish the image of the hand from the image of the ambient light.

Figure 7D:
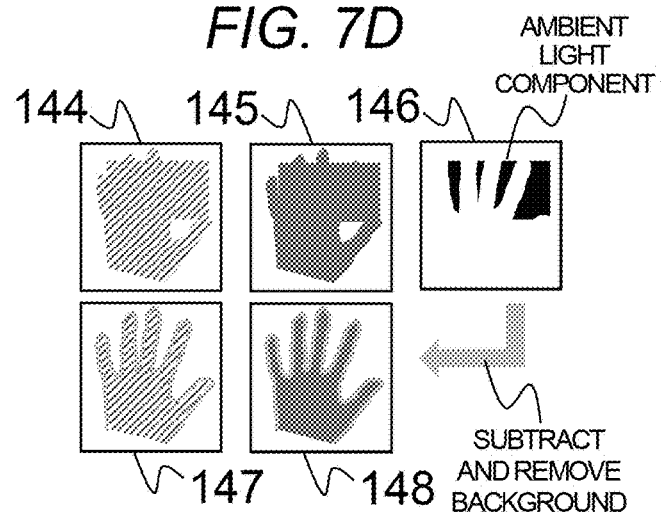

On the other hand, as shown in FIG. 7D, when a bandpass filter with an ambient light transmission band is equipped as shown in the present embodiment, images for three wavelengths, visible light image 144, infrared light image 145, and ambient light image 146, can be acquired by spectral processing. At this time, the ceiling 141 is reflected in the visible light image 144 and the infrared light image 145 as shown in FIG. 7C, and the contour line of the hand is vague and difficult to observe. However, only the ambient light image is reflected in the ambient light image 146 of the wavelength for detecting ambient light. Therefore, when the ambient light image 146 is subtracted from the visible light image 144 or infrared light image 145, the background-removed visible light image 147 or background-removed infrared image 148 can be acquired. In this way, the ambient light component can be accurately removed from the visible light image and infrared light image, and the authentication process can be realized without being affected by the ambient light.

As an embodiment of a specific process for background removal, the luminance value of the ambient light image may first be multiplied by a constant to a predetermined value, and then subtracted from the visible light image and infrared light image, respectively, to eliminate the ambient light portion. As another embodiment, first binarize the ambient light image with a certain threshold value, and define the pixels that have values as the background area. Then, the background area in the visible light image and infrared light image is replaced with black pixels. Then, the remaining bright area is binarized using a predetermined threshold or discriminant analysis, and the part with a value can be determined as the finger area. In the case of binarization, a morphology operation may be applied to remove fine noise components.

This makes it possible to correctly observe the posture of the photographed body even in an ambient light environment, and to achieve authentication that is robust to fluctuations in the lighting environment.

Figure 8A:
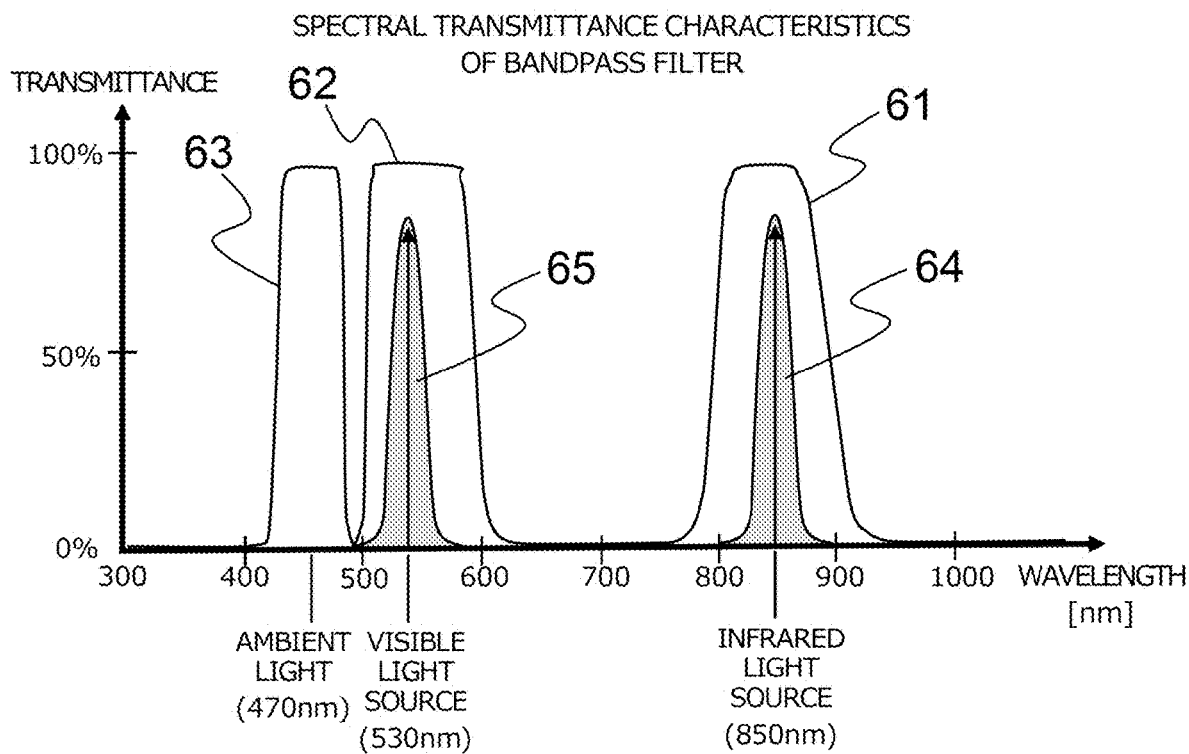
FIGS. 8A, and 8B illustrate other configurations of the spectral transmittance characteristics of the bandpass filter for the first embodiment.

In the present embodiment, the transmission band for detecting ambient light is set to around 470 nm, which is shared with the transmission band of the visible light source of the device to create a two-band band-pass filter configuration. However, it is sufficient to include the wavelengths of multiple light sources equipped for biometric observation and some wavelength bands for ambient light photography that do not include these wavelength bands. The number of wavelengths can be set arbitrarily. Therefore, for example, it can be used as a 3-band bandpass filter that transmits the portion of the passband of ambient light 63 independently, as shown in FIG. 8A. In this way, the visible light wavelengths are less likely to mix with the ambient light wavelengths, and thus the image quality of the spectral image can be improved. However, in general, increasing the number of transmission bands of a bandpass filter increases the cost, so sharing the same bands as shown in FIG. 3 has the advantage of lowering the cost.

Figure 8B:
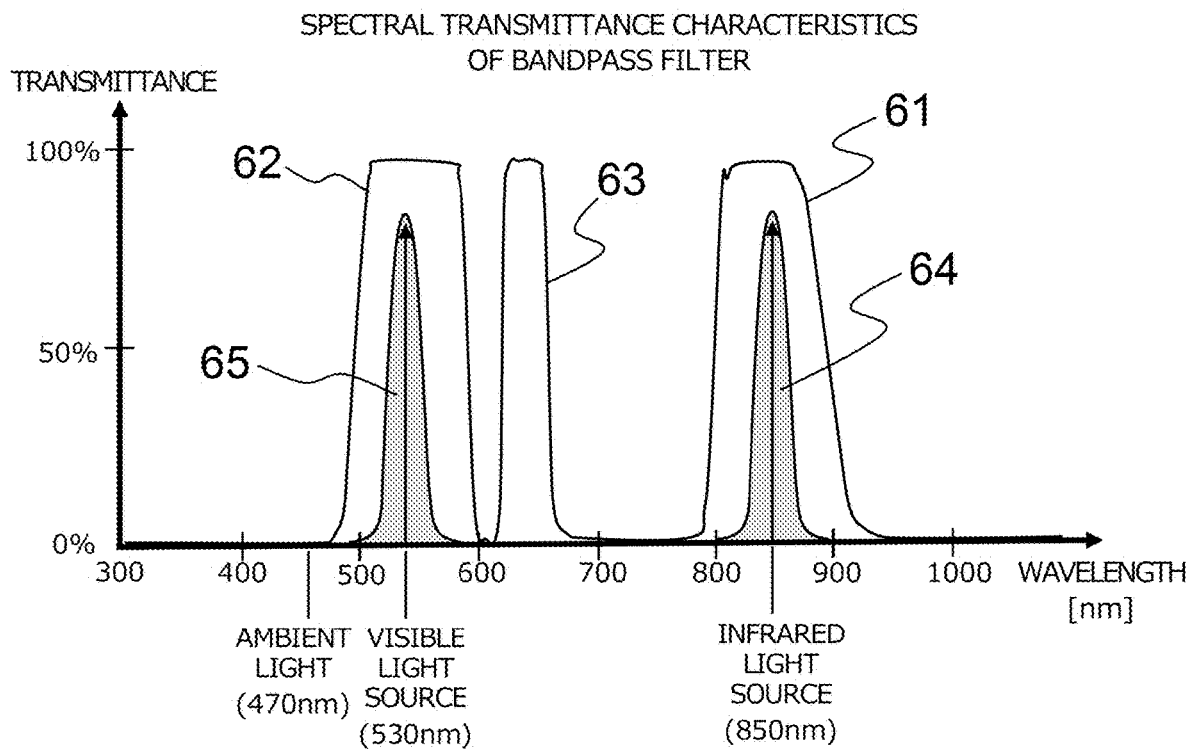

In the present embodiment, the transmission band of the ambient light was set to 470 nm near blue, but it can be set to another wavelength band. For example, as shown in FIG. 8B, it is possible to set the transmission band 63 of the ambient light from orange to near red, from 600 nm to 650 nm, and multiple bands for ambient light imaging can also be set. This wavelength setting is determined by taking into account the wavelength of the light source for photographing the living body, the light receiving sensitivity characteristics of the camera, the wavelength of the ambient light to be detected, and other factors. In the present embodiment, based on the fact that general color cameras are set to have high photosensitivity for blue, green, and red, green and infrared (red) {if using a camera that is not sensitive to infrared light, use red instead of infrared} are used for photographing the living body, and blue is used for ambient light. It goes without saying that other combinations can be used, for example, blue and infrared (red) for imaging of the living body and green for ambient light. In addition, when using an RGBIr camera that has an independent element specialized for infrared sensitivity instead of an RGB camera, for example, green and infrared can be used for photographing the living body, and blue and red can be used for ambient light, and the combination can be set arbitrarily.

Second Embodiment

A second embodiment is an embodiment of a technology that uses the image capturing device shown in the first embodiment and images of a subject consisting of multiple wavelengths to estimate the range between the camera and the subject pixel by pixel, and uses this information to correct and guide the deformation of the subject, thereby increasing the accuracy of biometric authentication.

Figure 9A:
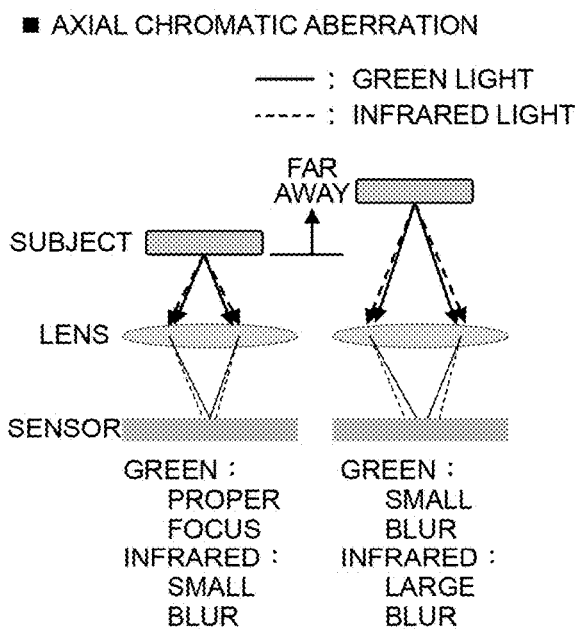
FIGS. 9A, and 9B illustrate the principle of range measurement of a subject for a second embodiment.
Figure 9B:
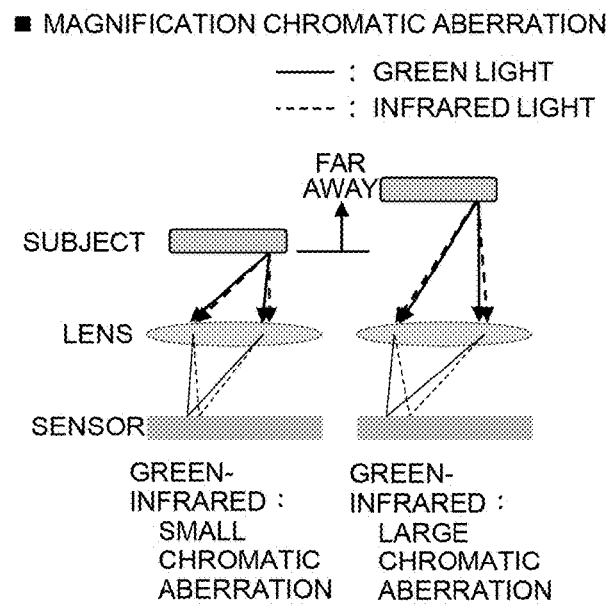

FIGS. 9A and 9B show the principle of range measurement of a subject using visible light and infrared light images. In the present embodiment, a living body is photographed by light sources of different wavelengths. In general, the optical characteristics of the camera lens, such as the refractive index, differ slightly for each wavelength, so the image formation position and focus may differ for each wavelength. Therefore, when images are checked at different wavelengths, the image at one wavelength may be in focus, but the image at the other wavelength may be out of focus and blurred, or even if the image is correctly focused, the position on the image at each wavelength may be slightly off. Such misalignment of focus and image formation position is called chromatic aberration. FIGS. 9A and 9B illustrate axial chromatic aberration and magnification chromatic aberration, respectively.

In the case of axial chromatic aberration, for example, the image may be in focus in green light but blurry in infrared light, or it may be blurry in both wavelengths but with different degrees of blur. In general, the degree of blur in images at both wavelengths varies depending on the range between the camera and the subject. In addition, in the case of magnification chromatic aberration, the position of the image formed by green light and infrared light may differ, and the degree of displacement generally varies depending on the range between the camera and the subject. In other words, the range of a subject can be estimated by measuring the degree of blur or misalignment caused by chromatic aberration. There is also monochromatic aberration, which causes blur and distortion due to slight shifts in focus depending on the position of the image, even within an image of the same wavelength. These are generally referred to as lens aberrations.

The degree of lens aberration varies not only depending on the range between the subject and the camera, but also depending on the characteristics of the lens used, the wavelength of the light source used for shooting, and the coordinate position on the image. Therefore, if the camera lens is determined beforehand and the degree of aberration is measured at each coordinate position on the image while changing the wavelength of the light and the range of the subject each time, and the data is stored, it is possible to estimate the range between the subject and the camera by calculating these backwards and measuring the degree of aberration at each coordinate position while changing the wavelength.

One method of measuring the difference in the degree of lens aberration at different wavelengths is to estimate the corresponding points in the spectral images for two wavelengths and their amount of misalignment using key point features such as SIFT (Scaled Invariance Feature Transform), as well as to estimate the point spread function between the corresponding points, and to estimate the range from the amount of misalignment and blur. Then, by examining the correlation between the range of the subject and the amount of misalignment and blur, the range of the subject can be estimated from the amount of misalignment and blur. However, the point spread function, which indicates the amount of shift of the corresponding point and the blur of the image, is assumed to vary in a complicated manner depending on the wavelength of the light source used, the lens characteristics, the position on the image, the range of the subject, etc., and it is not easy to derive the relationship between them. Therefore, range estimation based on the analysis of such complex physical phenomena can be efficiently implemented by using machine learning, including deep neural networks, which can flexibly approximate arbitrary functions.

Figure 10:
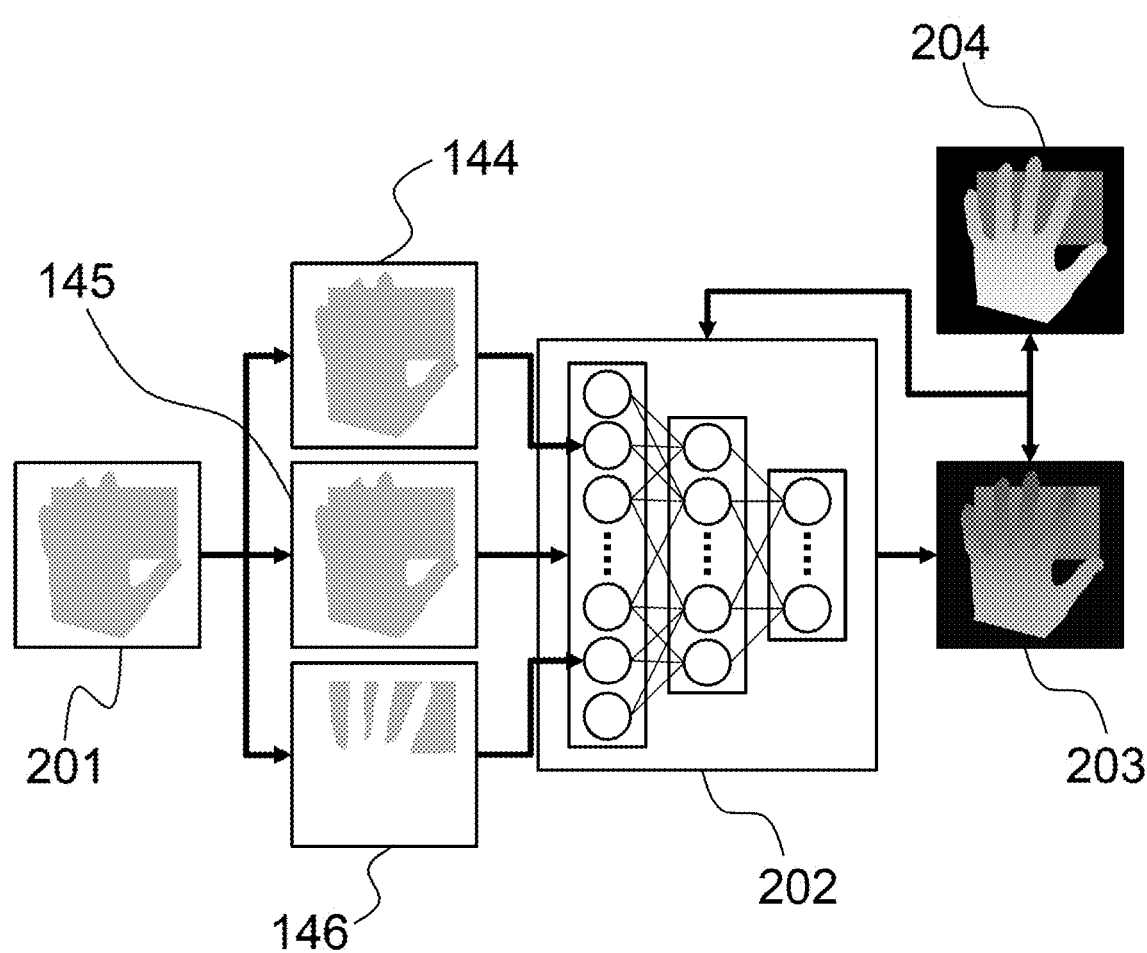
FIG. 10 shows an example of a neural network for learning and inferring the range of a subject for the second embodiment.

FIG. 10 shows an example of the configuration diagram of the neural network that learns and infers the range of a subject in the device configuration of the present embodiment. First, for the original image 201 in which light of each wavelength is mixed as the input image, images of three wavelengths (visible light image 144, infrared light image 145, and ambient light image 146) are extracted respectively by the spectral image processing described above. Next, these images are input to a deep neural network 202, which extracts features such as the degree of edge blur and the amount of edge shift according to the color and coordinates of the image, and the final layer outputs the estimated range value of the subject for each pixel. As a result, an inferred range image 203 is obtained. The deep neural network 202 used here can be, for example, a deep convolutional neural network.

During the training of the neural network, an error between the inference result and the correct answer is generated, so the parameters in the network are updated to minimize the error. In other words, the error between the inference result and the correct answer is defined as a loss function, and the parameters are updated so that the loss function is minimized using the error back propagation method. As a loss function, for example, we can prepare a range image 204 of the correct answer, which is measured by another method such as a range sensor using infrared rays, and proceed with learning the parameters in the neural network so as to minimize the sum of squared differences for each pixel between the inferred range image 203 and the range image 204 of the correct answer.

In this way, by preparing a large number of input images and correct images for learning, it is ultimately possible to infer accurate range images by simply providing the input images. In particular, deep convolutional neural networks can efficiently learn phenomena that are difficult to formulate in physical models, such as the degree of edge misalignment and blur in images, and the degree of distortion in images, i.e., in other words, the range of a subject can be automatically acquired from the characteristics of differences and changes within and between images at each wavelength caused by lens aberration.

In order to obtain a large number of input images and correct images in the training of the neural network, the same living body is photographed by the input device shown in the first embodiment and the range sensor described above installed in close proximity. The misalignment of the field of view of both cameras can be calibrated in advance, and the amount of misalignment between the input image and the correct image can be corrected.

In particular, since this method limits the light to three fixed wavelength bands, many of the conditions for chromatic aberration can be fixed in advance. Therefore, it has the advantage of improving the accuracy of range estimation compared to the application of the same technique in a general system that is not equipped with a bandpass filter.

The process shown in FIGS. 4 and 5 can be used as an embodiment of biometric registration and authentication process using the range information thus acquired. Specifically, the range estimation described above is performed in the pre-processing of the background removal process (S405, S505). Then, the background removal process is performed using the range information. In the present embodiment, the background removal unit 24 is equipped with the aforementioned neural network and constitutes a new background removal process, including the range information estimation process. This makes it possible to crop the background from the hand and finger images more accurately by utilizing the range information, compared to the background removal shown in the first embodiment, for example. It can also be used to acquire 3D spatial orientation information, such as only the fingertips are too close to the camera. This makes it possible to more appropriately guide the posture of the hand or finger held up by the user, or to automatically correct the geometry in image processing, thus improving the convenience and authentication accuracy in contactless authentication.

Third Embodiment

A third embodiment describes an example of an authentication device based on the technology illustrated in the first and the second embodiment, which is non-contact, intuitively guides the user to the position where the biometric is presented, and is robust to changes in environmental lighting.

Figure 11A:
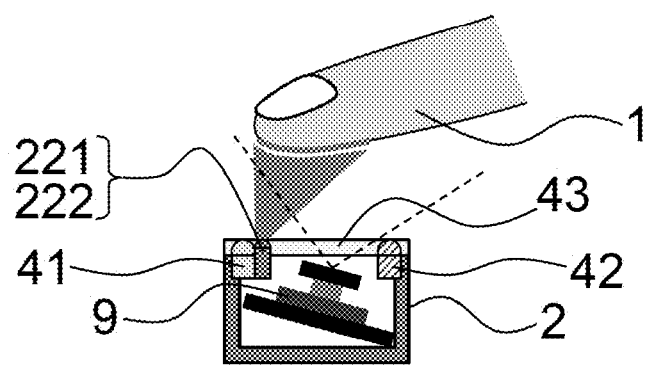
FIG. 11A is a cross-sectional view of an authentication device that guides the fingertip position.
Figure 11B:
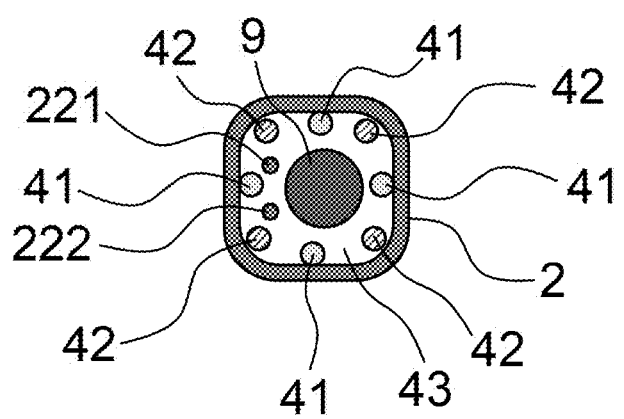
FIG. 11B is a top view of the authentication device for a third embodiment.

FIGS. 11A and 11B show an embodiment of a biometric authentication device that performs contactless authentication by guiding the position of a fingertip. A camera 9 is equipped inside the input device 2, and visible light sources 41 and infrared light sources 42 are arranged in a circle around it. The visible light sources 41 and the infrared light sources 42 can irradiate light uniformly to the finger 1 held above, and the intensity of each light source can be controlled independently as shown in the first embodiment. Although only one finger is shown in FIGS. 11A and 11B, as in the first embodiment above, multiple fingers can be used, for example, just one index finger.

Two fingertip guide light sources are installed on the circumference of the visible light sources 41 and the infrared light sources 42. The fingertip guide visible light source 221 and the fingertip guide infrared light source 222 can irradiate light of visible and infrared wavelengths with high directivity toward the upper part of the input device 2, respectively. The light emitted by the fingertip guide visible light source 221, for example, is the same green light as the visible light source 41 described above, and is visible to the user. The light of the fingertip guide infrared light source 222 is, for example, light of the same wavelength as the infrared light source 42 described above, and is not visible to the user. However, a light source that can simultaneously irradiate light of a visible wavelength in addition to the infrared light can be used to make this irradiated light visible.

The upper part of the camera 9 is equipped with a device top cover 43. The device top cover 43 combines the characteristics of the two bandpass filters shown in FIG. 3, for example, and transmits only three wavelengths of light in total: visible light source, infrared light source, and ambient light. Since the wavelengths of the fingertip guide light are transmitted through the bandpass filter, they can be captured by the camera 9.

The camera 9 is installed at a slight inclination to the input device 2. In the present embodiment, the camera 9 is tilted to the right side of the drawing, and it is assumed that the finger 1 is held from the right side of the drawing to the left. This tilt allows the camera 9 to capture the entire finger, including the tip and base of the finger, even when the fingertip is held directly above the device, thus increasing the accuracy of authentication as many biometric features can be captured.

The process flow of registration and authentication by this device is basically the same as that shown in FIGS. 4 and 5 of the first embodiment, respectively. The major difference between the third embodiment and the first embodiment is the use of a fingertip guide light source in the display of the guide (S401) that prompts the user to present a finger. An embodiment of the finger guide using the fingertip guide light source is described below.

First, the user holds the fingertip of finger 1 directly above the input device 2. Since the input device 2 is about the same size as a standard fingertip and is circular in shape, reminiscent of a push button that is pressed with the fingertip, the user's fingertip is naturally guided to the top of the input device 2. At this time, the fingertips are illuminated by light emitted from the fingertip guide light sources 221 and 222 directly above the input device 2. The user fine-tunes the position of the fingertip so that the fingertip is slightly brightened by the visible green light from the guide light. By confirming that the fingertip is illuminated by the green light, the user can see the correct position even when the finger is held up without contact.

In the present embodiment, it is assumed that multiple fingers, for example, index, middle and ring fingers, are to be photographed. Since the fingertip guide light is directed directly above the device, it is convenient to operate the device in such a way that the light shines on the middle finger, so that the three fingers are positioned in the center of the camera. However, since it is generally easier to operate the device by holding up the tip of the index finger naturally, the camera shall be designed with a slightly wider angle of view so that even if multiple fingers are off-center, the fingers can be photographed without sticking out.

Figure 12A:
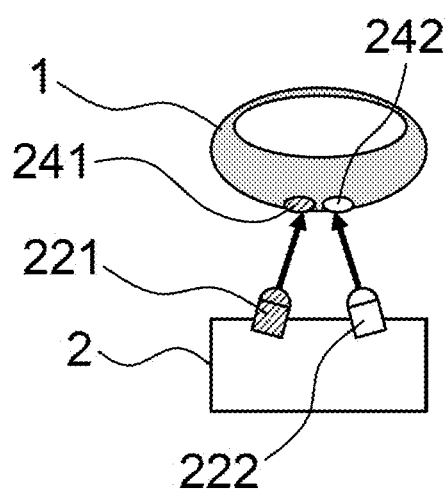
FIGS. 12A, 12B, 12C, and 12D are illustrations of an embodiment of estimating the range of a finger for the third embodiment.
Figure 12B:
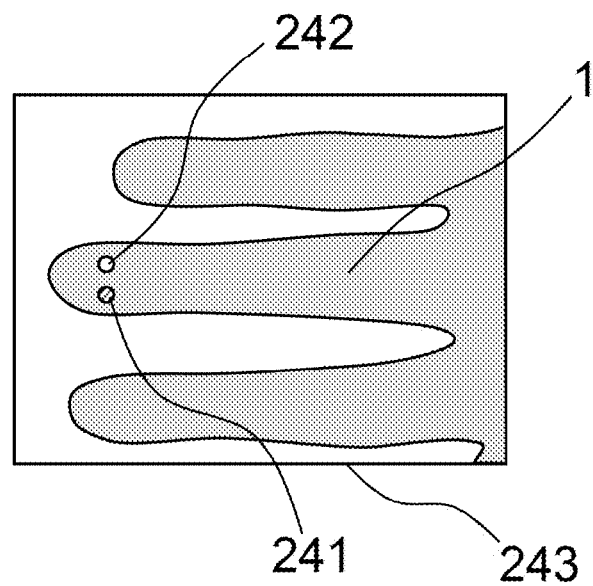
Figure 12C:
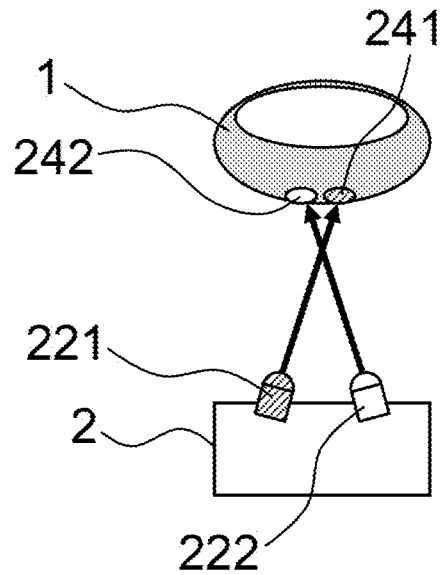

FIGS. 12A, 12B, 12C, and 12D illustrate an embodiment of automatic estimation of the position and range of a finger by the light emitted from the fingertip guide light source. If the finger 1 is too close or too far away from the device, the camera may not be able to focus on the finger, or it may be too far away to capture images with sufficient spatial resolution, resulting in degradation of image quality. Therefore, the authentication system needs to automatically detect such a situation and guide the user to keep the finger at an appropriate range. As shown in FIG. 12A or 12C, two spotlights are emitted from the fingertip guide light sources 221 and 222, projecting two bright spots on the fingertip. At this time, both guide light sources are installed at a slight inclination toward the center of the input device 2, so that the light from both light sources is not parallel but crosses each other. The inclination of the two guide light sources is adjusted so that they intersect at an appropriate range for the camera to focus.

FIG. 12A shows the fingertip guide light bright spot when the finger is held over the device at an appropriate range. The visible light emitted from the fingertip guide visible light source 221 irradiates the fingertip portion of finger 1, producing the visible light bright spot 241 of the fingertip guide light. Similarly, the light emitted from the fingertip guide infrared light source 222 produces the infrared light bright spot 242 of the fingertip guide light. At this time, the visible light is irradiated on the left of the drawing and the infrared light is irradiated on the right. At this time, as shown in FIG. 12B, the image taken by the camera 9 is divided into visible light and infrared light by spectral processing as described above, and the spectral images 243 of visible light and infrared light acquired at that time show the bright spots of the corresponding wavelengths. In this example, the infrared light spot 242 of the fingertip guide light appears in the upper part of the spectral image, and the visible light spot 241 of the fingertip guide light appears in the lower part. Since the spectroscopic processing can determine which wavelength these two light spots were irradiated with, it is possible to measure the positional relationship of the light spots on the image, such as which wavelength light spot is on top and the distance between the center positions of the two light spots. Based on this information, it is possible to determine whether the fingertip is at the appropriate distance or not.

If the finger 1 gets closer to the input device 2 than in the example in FIG. 12A, the distance between the two bright spots will become farther apart, although the positional relationship between the two bright spots on the image remains the same, in which case it can be determined that the finger is too close. Therefore, if the distance between the two bright spots is farther than a certain distance, the user can be guided appropriately by saying "Please move your finger away". In addition, if there is no or only one bright spot on the fingertip, the fingertip is misaligned, so the user can be guided by providing guidance such as "Please hold your fingertip directly above the device".

Figure 12D:
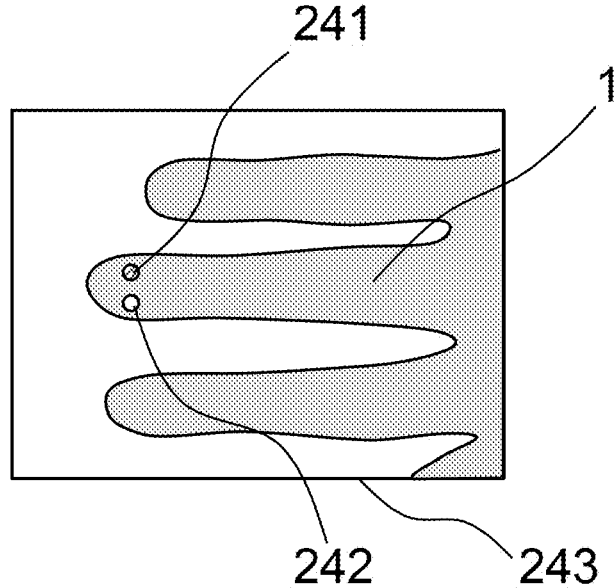

FIG. 12C shows the situation when the finger is too far away from the input device 2. In this case, the visible light bright spot 241 of the fingertip guide light is located to the right of the infrared light bright spot 242 of the fingertip guide light, contrary to FIG. 12A. Therefore, the positional relationship of the light spots in the visible light and infrared light spectral images 243 shown in FIG. 12D is reversed from that in FIG. 12B, and the visible light spot 241 of the fingertip guide light is located above. Therefore, when such a situation is detected in the image, guidance such as "Please move a little closer" can be presented.

Once it has been determined that the finger 1 has been presented at the appropriate range, both fingertip guide light sources are turned off and the visible light source and infrared light source 42 are illuminated to the finger 1 to capture images. Then, as shown in the first embodiment above, the visible light image, infrared light image, and ambient light image of the finger are acquired for authentication. The visible light source 41 and the infrared light source 42 may be irradiated while the fingertip guide light 221 and 222 are irradiated. The fingertip guide light only irradiates a strong spot light only on the fingertip and not on the entire finger. Therefore, the visible light source 41 and infrared light source 42 can be adjusted to the appropriate light intensity in parallel while the fingertip is being guided, thus shortening the shooting time.

The wavelength of the fingertip guide visible light source 221 can be any wavelength of visible light that can be passed through a bandpass filter. For example, if the bandpass filter characteristics of FIG. 3 or FIG. 8A are used, 530 nm or 470 nm can be used, and if FIG. 8B is used, 620 nm can be used. Any of these wavelengths can be used as long as the light is visible to the user and can be captured by a camera, and the wavelength component can be obtained by spectral processing.

Figure 13A:
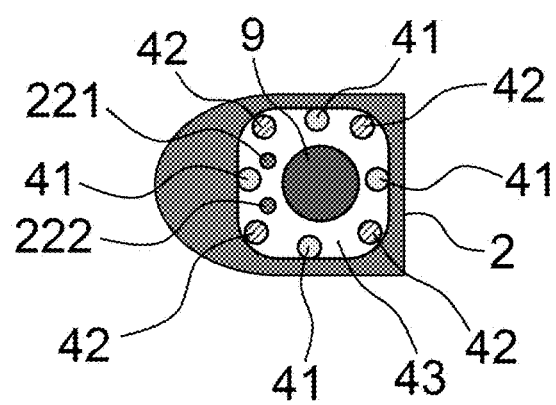
FIGS. 13A, 13B, and 13C illustrate an example of a fingertip-guiding device structure for the third embodiment.

The device structure shown in FIGS. 11A and 11B depends on the direction of the tilt of the camera 9, and the direction of the fingertip is fixed to the direction pointing to the left in the drawing. In this case, if the device structure is entirely circular, it may be difficult to intuitively understand the direction to hold the fingertip. In contrast, as shown in FIG. 13A, the entire device may be shaped as an enclosure that mimics the shape of a fingertip. This makes it easier to intuitively understand that the direction of the semicircle in the device housing is the direction in which the finger is presented.

Figure 13B:
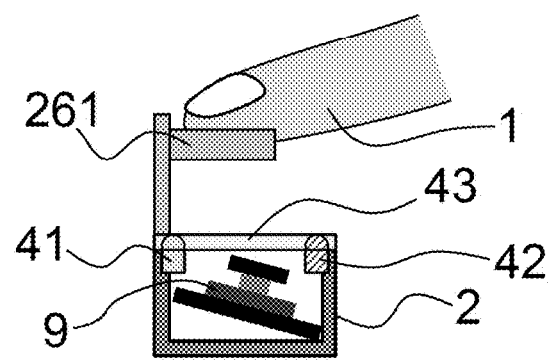

Similarly, if the usage situation allows contact with the device, a finger rest 261 can be provided to physically fix the finger as shown in FIG. 13B. This makes it easier to understand the direction and position of the fingertip, and also stabilizes the position of the finger, reducing posture fluctuation and improving authentication accuracy. It also contributes to improved operability for users who find it difficult to hold their fingers still by floating them in the air.

Figure 13C:
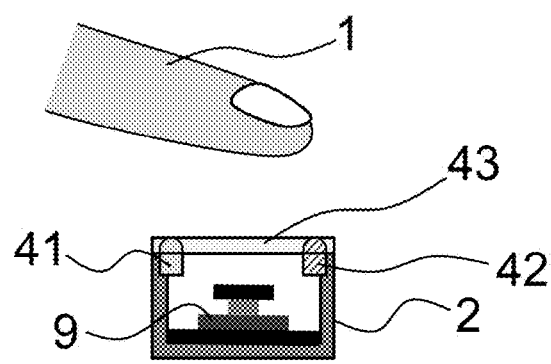

Alternatively, as shown in FIG. 13C, the axis of the camera 9 may not be tilted, but instead the camera may be replaced with a wide-angle camera or an omnidirectional camera, so that the appearance of the device remains circular and the image of the entire finger can be captured without tilting the axis of the camera. By doing so, the direction of the finger 1 can be presented from either side, which greatly improves the convenience of the user. In this case, the visible light source 41 and the infrared light source 42 should be light sources with wide directivity so that they can irradiate the reflected light widely. This allows the light sources of the two wavelengths to illuminate the finger appropriately even when the finger is held from either side.

Figure 14:
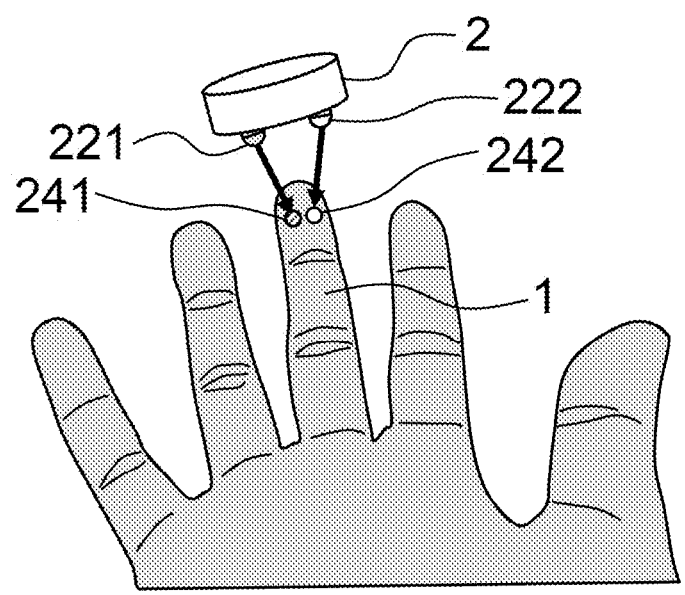
FIG. 14 shows an example of how the device is installed, for the third embodiment.

As shown in FIG. 14, the input device 2 in the present embodiment can be installed facing downward to take a picture of the area below, and the user can hold fingers 1 so that the fingers face the ceiling. In this case, the user can easily see the ventral side of the finger 1, in particular, the user can directly check whether the visible light bright spot 241 of the fingertip guide light is illuminating the fingertip correctly, which has the advantage that positioning can be easily performed. In this case, the visible light spot 241 of the fingertip guide light can be an elongated spot light along the central axis of the finger, for example, instead of a point-like spot light, and in that case, the direction in which the finger is held can also be guided, so that the user can be guided more accurately.

Such a compact, non-contact, highly accurate authentication device that is resistant to changes in the environment can be applied to various fields, such as door locks for private homes, keyless entry for automobiles, payment systems in stores, PC security in offices, and gate management systems for large facilities and large-scale events.

The present invention is not limited to the embodiments described above, but includes various variations. For example, the above embodiments have been described in detail for a better understanding of the present invention, and are not necessarily limited to those with all the described configurations. It is possible to replace some of the configurations of one embodiment with those of other embodiments, and it is possible to add configurations of other embodiments to those of one embodiment. It is also possible to add, delete, or substitute other configurations for some of the configurations of each embodiment.

What is claimed is:

1. A biometric authentication device, comprising:
a processor coupled to a memory storing instructions to permit the processor to function as:
  an image capturing unit that captures images of a living body through an optical filter that transmits light in a band including a first wavelength that irradiates the living body, light in a band including a second wavelength that is different from the first wavelength that irradiates the living body, and light in a band including a third wavelength that is different from the first and second wavelengths caused by an external environment, and blocks other wavelengths;
  a spectroscopic processing unit that separates and acquires an image of a light intensity of the first wavelength, an image of the light intensity of the second wavelength, and an image of the light intensity of the third wavelength from an obtained image of the living body;
  a background removal unit that extracts a background region from the image of the light intensity of the third wavelength and removes the background region from the images of the light intensity of the first and second wavelengths, respectively; and
  an authentication processing unit that extracts various features of the living body from the images of the light intensity of the first and second wavelengths with a background area removed, matches them with the biometric features for each individual registered in advance, calculates a degree of similarity for each biometric feature, and performs biometric authentication to identify the individual based on the degree of similarity of the various biometric features.

2. The biometric authentication device according to claim 1,
wherein the light of the first wavelength is green, the light of the second wavelength is infrared light or red, and the light of the third wavelength is blue.

3. The biometric authentication device according to claim 1,
wherein the light of the first wavelength is blue, the light of the second wavelength is infrared light or red, and the light of the third wavelength is green.

4. The biometric authentication device according to claim 1,
wherein the light of the first wavelength is green, the light of the second wavelength is infrared light, and the light of the third wavelength is blue and red.

5. The biometric authentication device according to claim 1,
wherein the optical filter has a configuration of a two-band pass filter in which the band including the first wavelength and the band including the third wavelength are one continuous transmission band and the two-band pass filter has two transmission bands together with a transmission band including the second wavelength, or the configuration of a three-band pass filter in which the bands including the first, second, and third wavelengths are all three transmission bands that are separated.

6. The biometric authentication device according to claim 1,
wherein the background removal unit is equipped with a neural network that has been learned by preparing a large number of image data separating images of light intensities of the first, second, and third wavelengths from images taken of a living body obtained by presenting the living body a large number of times in a learning process in advance, and range images of correct answers measured by a range sensor installed alongside the image capturing unit as teacher data; and
wherein the images of the light intensities of the first, second, and third wavelengths of a subject separated by the spectroscopic processing unit are input to the neural network to estimate the range image of the presented living body, and then the background removal unit extracts the background region from the range image, and removes the background region from the images of the light intensities of the first and second wavelengths, respectively.

7. The biometric authentication device according to claim 6,
wherein the neural network in the background removal unit is composed of a deep convolutional neural network.

8. The biometric authentication device according to claim 1,
wherein the image capturing unit is installed in a center of a housing of an input device where a living body is held by a user in a non-contact manner in order to have the living body imaged;
wherein a plurality of first light sources emitting light of the first wavelength are arranged at equal intervals on a circumference around the image capturing unit, at a top of the housing of the input device, and a plurality of second light sources emitting light of the second wavelength are similarly arranged at equal intervals on the circumference around the image capturing unit, at the top of the housing of the input device; and
wherein each light source irradiates the living body presented on top of the input device, and a reflected light from the living body is captured by the image capturing unit, and the light intensity of each light source is individually controlled so that an entire living body is uniformly illuminated.

9. The biometric authentication device according to claim 8,
wherein a pair of guide light source emitting light of the first wavelength and guide light source emitting light of the second wavelength are installed at the top of the input device, and both guide light sources emit highly directional spot lights that cross each other and are tilted from an optical axis of the image capturing unit to produce bright spots on a held-up living body; and
wherein the processor further functions as a guide unit recognizes a position of each bright spot, a distance between both bright spots, and their placement, estimates a range between the input device and the held-up living body, and outputs a guide that properly guides the user.

10. The biometric authentication device according to claim 9,
wherein the optical axis of the image capturing unit is tilted from a vertical direction of the housing of the input device in order to capture the entire living body presented on the top of the housing of the input device.

11. The biometric authentication device according to claim 9,
wherein the housing of the input device is shaped to mimic the shape of a living body in the direction the user is holding it.

12. The biometric authentication device according to claim 8,
wherein the housing of the input device is equipped with a rest on which the user can place a living body in order to physically fix a posture of the living body held up for authentication.

13. The biometric authentication device according to claim 8,
wherein the image capturing unit is a wide-angle camera or an omnidirectional camera.

14. A biometric authentication method, comprising:
capturing an image of a living body held up by a user, through an optical filter that transmits light in a band including a first wavelength that irradiates the living body, light in a band including a second wavelength that is different from the first wavelength that irradiates the living body, and light in a band including a third wavelength that is different from the first and second wavelengths caused by an external environment, and blocks other wavelengths;
separating and acquiring an image of a light intensity of the first wavelength, an image of the light intensity of the second wavelength, and an image of the light intensity of the third wavelength from an obtained image of the living body;
extracting a background region from the image of the light intensity of the third wavelength and removes the background region from the images of the light intensity of the first and second wavelengths, respectively; and
extracting various features of the living body from the images of the light intensity of the first and second wavelengths with a background area removed, matches them with the biometric features for each individual registered in advance calculates a degree of similarity for each biometric feature, and performs biometric authentication to identify the individual based on a degree of similarity of the various biometric features.

15. The biometric authentication method according to claim 14, wherein, when imaging a living body held up by a user, in order to guide the user's living body to an appropriate position and posture, a guide light of the first wavelength and a guide light of the second wavelength are irradiated as highly directional spotlights that intersect each other and are tilted from an optical axis of a processor that functions as an image capturing unit to produce bright spots on a held-up living body, and wherein the processor further functions as a guide unit recognizes the position of each bright spot, a distance between both bright spots, and their placement, estimates a range between an input device and the held-up living body, and outputs a guide that properly guides the user.

\* \* \* \* \*